(12) United States Patent
Brown et al.

(10) Patent No.: US 10,352,419 B2
(45) Date of Patent: Jul. 16, 2019

(54) CARRIER STOP FOR SPLIT RING PLANETARY DRIVE

(71) Applicant: BorgWarner Inc., Auburn Hills, MI (US)

(72) Inventors: Daniel Brown, Freeville, NY (US); Chad McCloy, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/635,281

(22) Filed: Jun. 28, 2017

(65) Prior Publication Data

US 2018/0003277 A1  Jan. 4, 2018

Related U.S. Application Data

(60) Provisional application No. 62/356,657, filed on Jun. 30, 2016.

(51) Int. Cl.
| | |
|---|---|
| *F16H 1/28* | (2006.01) |
| *F16H 35/00* | (2006.01) |
| *F16H 57/08* | (2006.01) |
| *F16H 57/12* | (2006.01) |
| *F16H 35/18* | (2006.01) |

(52) U.S. Cl.
CPC ............ *F16H 35/008* (2013.01); *F16H 1/28* (2013.01); *F16H 35/18* (2013.01); *F16H 57/082* (2013.01); *F16H 57/12* (2013.01); *F16H 2001/2872* (2013.01)

(58) Field of Classification Search
CPC ........ F16H 35/008; F16H 35/18; F16H 57/12; F16H 1/28; F16H 57/082; F16H 2001/2872
See application file for complete search history.

(56) References Cited

U.S. PATENT DOCUMENTS

| | | | |
|---|---|---|---|
| 7,371,200 B2 | 5/2008 | Young | |
| 7,578,271 B2 | 8/2009 | Sugiara | |
| 8,651,076 B2 | 2/2014 | Walliser et al. | |
| 2004/0121879 A1* | 6/2004 | Schulz | F16H 57/082 475/331 |
| 2004/0213671 A1* | 10/2004 | Flamang | F16H 1/28 416/170 R |
| 2005/0255961 A1* | 11/2005 | Morita | F16H 57/021 475/331 |
| 2012/0145104 A1 | 6/2012 | David et al. | |

(Continued)

FOREIGN PATENT DOCUMENTS

| | | |
|---|---|---|
| DE | 3721362 A1 | 2/1988 |
| EP | 2006501 A1 | 12/2008 |

(Continued)

*Primary Examiner* — David J Hlavka
(74) *Attorney, Agent, or Firm* — Brown & Michaels, PC

(57) ABSTRACT

A split ring planetary drive with at least one travel end stop received in at least one pocket of a first ring gear. The travel end stop is moveable between a first stop position in which as the planetary drive rotates in a direction the travel end stop engages the stop on the planet carrier, preventing further rotation of the split ring planetary drive in the direction, and a second position in which the travel end stop does not engage the stop on the planet carrier. The travel end stop may be a deadbolt, a snap ring or pivoting pawl.

15 Claims, 37 Drawing Sheets

(56) References Cited

U.S. PATENT DOCUMENTS

| | | | |
|---|---|---|---|
| 2015/0047450 A1* | 2/2015 | Mitchum | F16H 55/18 |
| | | | 74/445 |
| 2015/0315939 A1 | 11/2015 | Showalter | |
| 2017/0254235 A1* | 9/2017 | Pluta | F01L 1/352 |

FOREIGN PATENT DOCUMENTS

| EP | 2676011 A2 | 12/2013 |
|---|---|---|
| GB | 643525 A | 9/1950 |
| JP | S6187910 A | 5/1986 |
| JP | 2002349705 A | 12/2002 |
| JP | 2010203550 A | 9/2010 |
| JP | 2011202764 A | 10/2011 |

\* cited by examiner

CARRIER STOP FOR SPLIT RING PLANETARY DRIVE

REFERENCE TO RELATED APPLICATIONS

This application claims one or more inventions which were disclosed in Provisional Application No. 62/356,657, filed Jun. 30, 2016, entitled "CARRIER STOP FOR SPLIT RING PLANETARY DRIVE". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of electric phasers. More particularly, the invention pertains to a carrier stop for an electric phaser.

Description of Related Art

Variable cam timing or "VCT" is a process that refers to controlling and varying, when desirable, the angular relationship (the "phase") between the drive shaft and one or more camshafts, which control the engine's intake and exhaust valves. In a closed loop VCT system, the system measures the angular displacement, or phase angle, of a camshaft relative to the crankshaft to which it is operatively connected, and then alters the phase angle to adjust various engine characteristics in response to demands for either an increase or a reduction in power. Typically, there is a feedback loop in which the desired values of such engine characteristics are measured against their existing values, and changes are effected inside the engine in response to any variances. To accomplish this, modern automobiles usually have one or more Electronic Control Units (ECU), which constantly analyze data fed into them from various parts of the engine or from other parts of the automobile, such as, for example, exhaust gas sensors, pressure sensors, and temperature sensors. A control signal is then emitted in response to such data. For example, with regard to VCT systems, as changes occur in engine or external conditions, the angular displacement between the camshaft and the crankshaft is adjusted accordingly.

A VCT system includes a cam phasing control device, sometimes referred to as a phaser, control valves, control valve actuators, and control circuitry. An electric phaser (e-phaser) is driven by an electric motor to control and vary the angular relationship between the drive shaft and one or more camshafts. In response to input signals, the electric phaser adjusts the camshaft to either advance or retard engine timing.

These systems have a high ratio gear train and can phase the camshaft relative to the crankshaft by means of a motor spinning at a speed relative to the camshaft. As the motor spins faster than the camshaft, the phaser will phase the camshaft relative to the crank shaft in one direction and as the motor slows down, and possibly spins in the other direction, the camshaft to crank shaft phase will move in the opposite direction.

In order to change the angular relationship between the drive shaft and one or more camshafts, the travel of the phaser needs to be limited, however stopping one of the rings gears relative to the other can cause the planet gears to over-run slightly, which can bind the planet gears. The motor used to drive the sun gear may not always provide enough torque to undo the binding of the planetary gears. Furthermore, limiting the travel of the carrier in order to stop the travel of the phaser at specific stops is problematic as well, as the carrier rotates more than once during phaser travel.

SUMMARY OF THE INVENTION

A split ring planetary drive with at least one travel end stop received in at least one pocket of a first ring gear. The travel end stop is moveable between a first stop position in which as the planetary drive rotates in a direction, the travel end stop engages the stop on the planet carrier, preventing further rotation of the split ring planetary drive in the direction, and a second position in which the travel end stop does not engage the stop on the planet carrier. The travel end stop may be a deadbolt, snap ring or a pivoting pawl.

In another embodiment, the split ring planetary drive has a travel end stop received in a pocket of a first ring gear. The pocket has a ramped slot. A first travel end stop being moveable between a first stop position in which the first travel end stop engages with the ramped slot and an axial portion of the carrier, preventing rotation of the split ring planetary drive in a direction, and a second position in which the first travel end stop does not engage the ramped slot or the axial portion of the planetary gear. The travel end stop may be a pin.

DETAILED DESCRIPTION OF THE INVENTION

Figure 1:
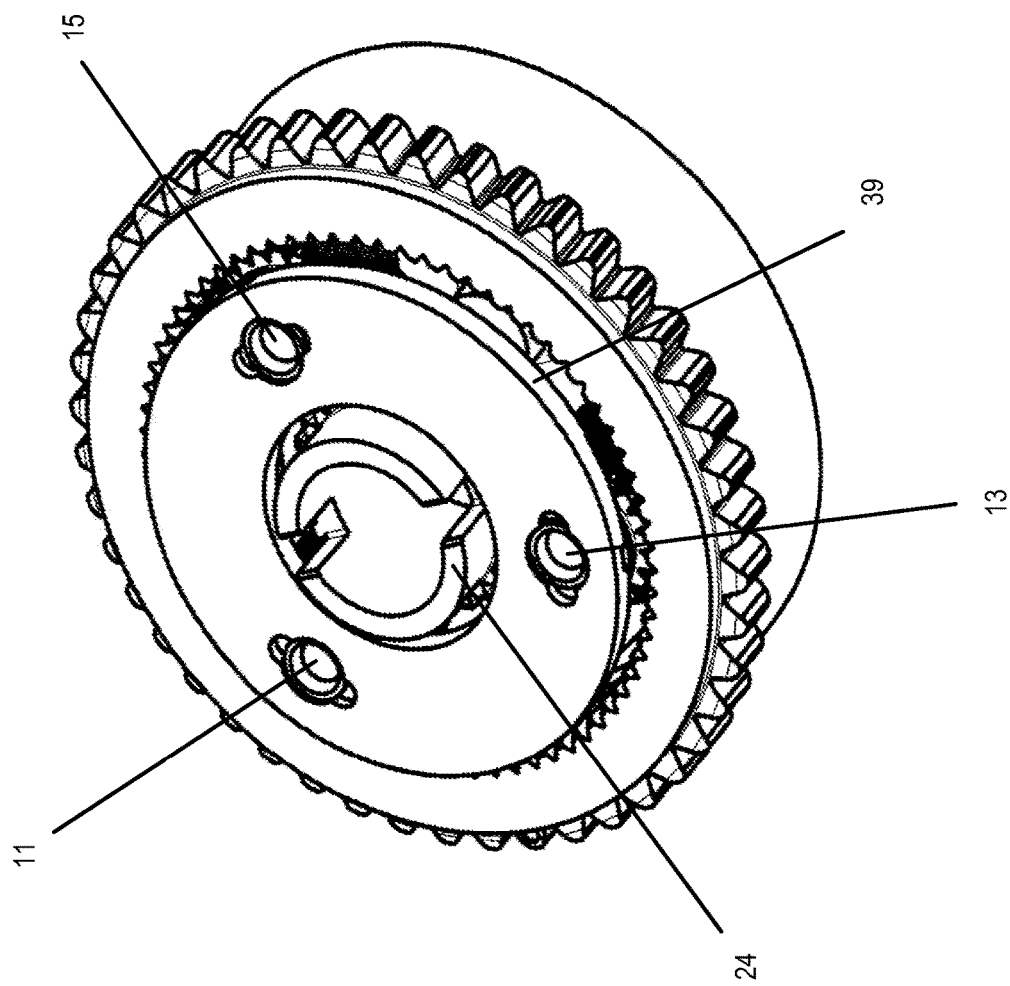
FIG. 1 shows a perspective view of a phaser of a first embodiment of the present invention with a travel end stop of a deadbolt stop.
Figure 2:
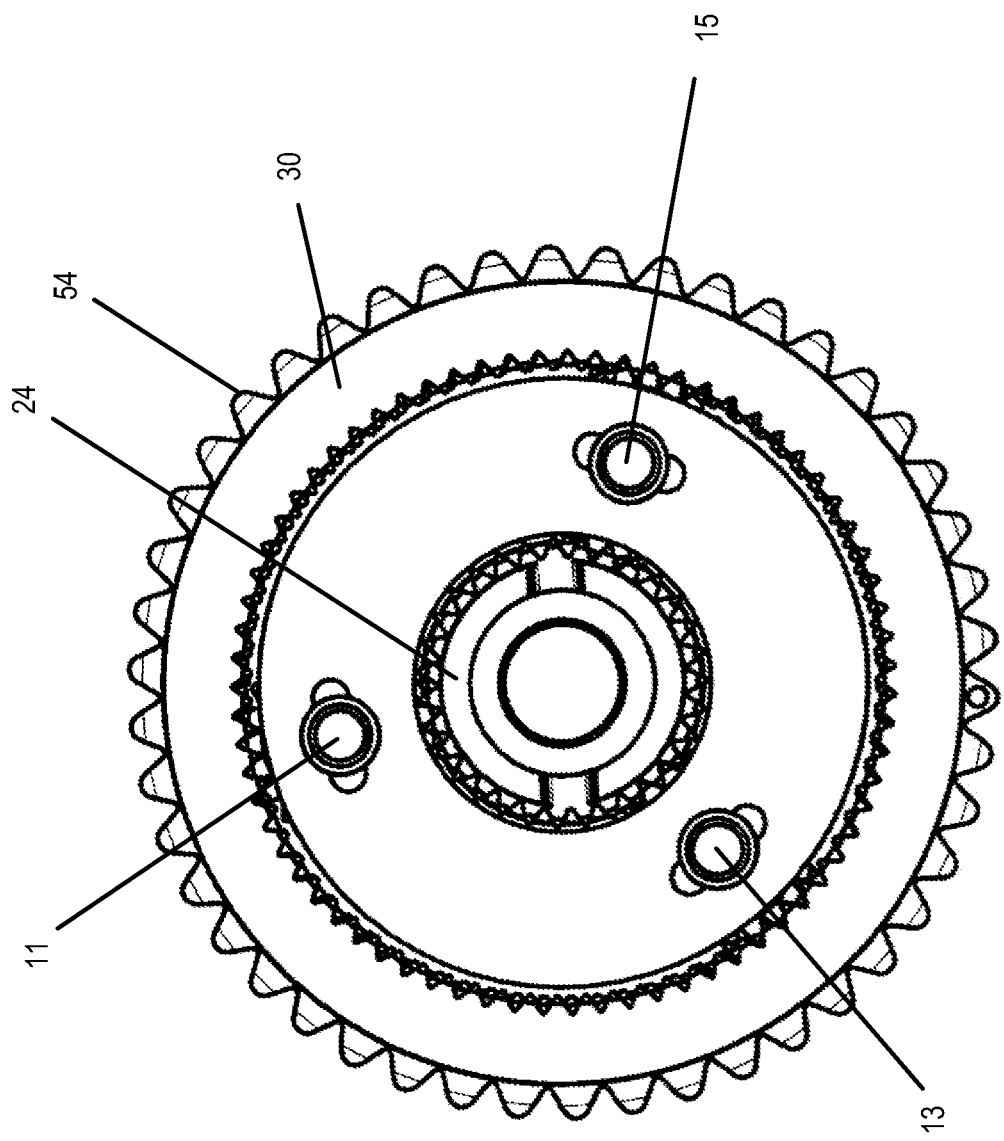
FIG. 2 shows a front view of the phaser of the first embodiment of the present invention.
Figure 3:
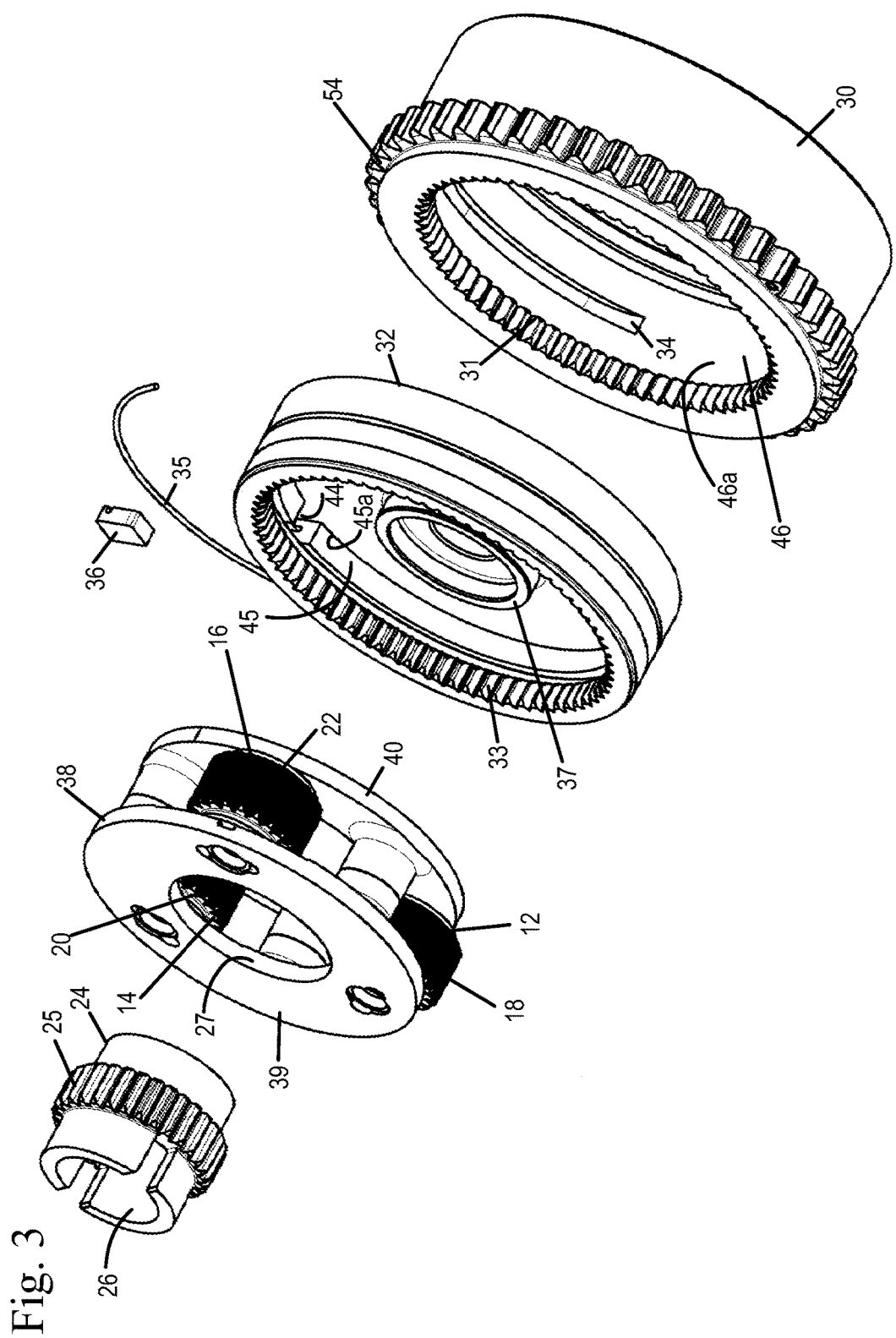
FIG. 3 shows an exploded view of the phaser of the first embodiment of the present invention.
Figure 4:
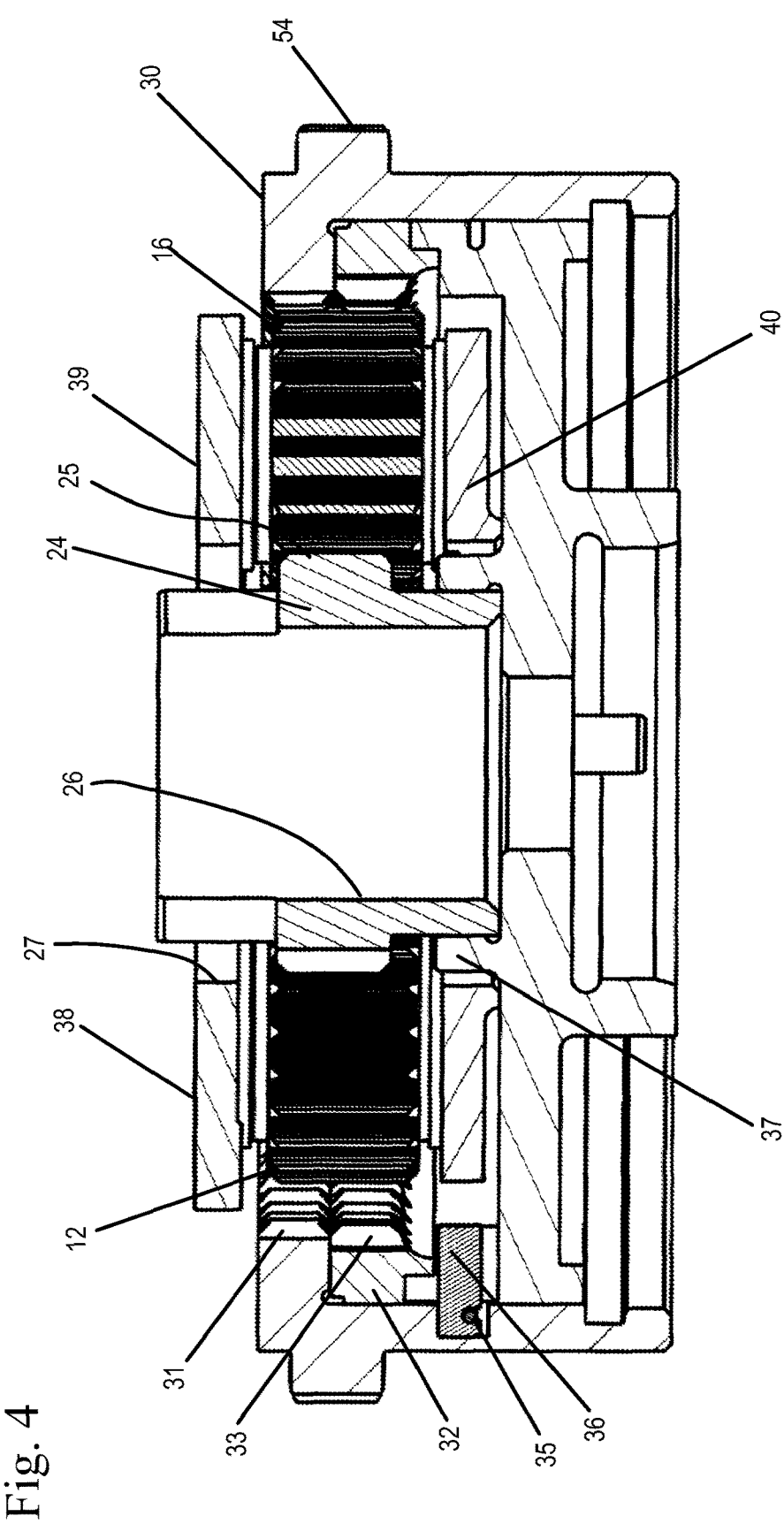
FIG. 4 shows a vertical section of the phaser of the first embodiment of the present invention.

It should be noted that in some of the figures, the planetary gears have been removed to simplify the drawings.

An electric phaser dynamically adjusts the rotational relationship of the camshaft of an internal combustion engine with respect to the engine crankshaft using an electrical actuator such as an electric motor. The electric phaser of the present invention includes a planetary drive system driven by an electric motor. The planetary drive system may include a centrally-located sun gear, and a plurality of planet gears engaging the sun gear. The planetary drive system may be a split ring planetary drive system with a sprocket ring gear driven by the engine crankshaft and a camshaft ring gear concentric with the sun gear and connected to the camshaft. A planet carrier may be present to connect the planet gears together. The electric motor is preferably a brushless DC motor, although it will be understood that other forms of motors such as DC motors with brushes, AC motors or stepping motors can be used. Alternatively, the planetary drive system is not split and is a single ring planetary system.

In the split-ring planetary phaser, there is a tooth count difference between the camshaft ring gear and the sprocket ring gear. The camshaft ring gear moves at a slightly different speed than the sprocket ring gear due to the tooth difference when the sun gear rotates at a different speed than the camshaft. The camshaft may move in the same or the opposite direction as the sun gear, depending on the sign of the gear ratio. Although the relationship between advancing, retarding and moving the carrier from stop to stop will depend on the sign of the gear ratio, it will become apparent to one skilled in the art that the embodiments shown apply to either positive or negative gear ratios.

In some embodiments, an electric motor is connected to the sun gear to drive the sun gear in relation to the planet gears. When the electric motor rotates the sun gear at the same speed as the sprocket ring gear, a constant phase position is maintained between the crankshaft and the camshaft. Under these conditions, the planetary gear assembly rotates as a unit with no relative movement between the sun gear and the planet gears or between the planet gears and the ring gears. Adjusting the electric motor speed with respect to the sprocket ring gear/camshaft ring gear/camshaft adjusts the phase of the camshaft with respect to the crankshaft. When the electric motor rotates the sun gear at a speed faster than the speed of the camshaft, the phaser is moved in the retarding direction. When the electric motor rotates the sun gear at a speed slower than the speed of the camshaft, the phaser is moved in the advancing direction.

The sprocket ring gear, the camshaft ring gear, the planet gears, and the sun gear are arranged in a planetary gear drive connection preferably having a high numerical gear ratio to allow accurate phasing angle adjustment with a relatively low driving torque requirement for the electric motor. The sprocket ring gear is preferably driven by the engine crankshaft through a sprocket and an endless loop power transmission chain, and the camshaft ring gear is preferably connected to rotate with the camshaft.

FIGS. 1-9 show a phaser of a first embodiment of the present invention with a travel end stop of a deadbolt stop.

The phaser 10 has a split ring gear planetary drive which includes planet gears 12, 14, 16 with planet gear teeth 18, 20, 22, a centrally located sun gear 24 with sun gear teeth 25, and a split ring gear including a sprocket ring gear 30 and a camshaft ring gear 32.

The sun gear 24 has a bore 26 for receiving an output shaft (not shown).

The planet gears 12, 14, 16 are held together by a carrier 38. The carrier 38 has a first plate 39 and a second plate 40. Each planet gear 12, 14, 16 is connected to a first plate 39 and a second plate 40 which makes up the carrier 38 through pins 11, 13, 15 in which the planet gears 12, 14, 16 rotate. On the carrier 38 is a stop 43. The carrier 38 has a centrally located bore 27 for receiving the sun gear 24. The sun gear teeth 25 of the sun gear 24 are aligned with and engage the planet gear teeth 18, 20, 22.

The carrier 38 and associated planet gears 12, 14, 16 are received within an inner diameter 45*a* defining a bore 45 of the camshaft ring gear 32. The camshaft ring gear 32 has a centrally located flange 37 that is received by the bore 27 of the carrier 38. Within the inner diameter 45*a* of the camshaft ring gear 32 is a set of ring gear teeth 33. A pocket 44 is present within the inner diameter 45*a* of the camshaft ring gear 32 and receives a stop or deadbolt 36.

The camshaft ring gear 32 is received by a bore 46 formed by an inner diameter 46*a* of the sprocket ring gear 30. A slot 34 is present in the inner diameter 46*a* of the sprocket ring gear 30 and receives the spring 35 and deadbolt 36.

On the inner diameter 46*a* of the sprocket ring gear 30 are sprocket ring gear teeth 31. The ring gears 30, 32 have different numbers of teeth 31, 33, where the difference in the number of teeth is a multiple of the number of planet gears 12, 14, 16. The ring gear teeth 31, 33 have profiles to allow the ring gears 30, 32 to mesh properly with the planet gears 12, 14, 16.

The planetary gears 12, 14, 16 rotate around the sun gear 24 and within the ring gears 30, 32 such that the planetary gears 12, 14, 16 travel along hypocycloid curves, a curve generated by the trace of a fixed point on a small circle (planetary gear) that rolls within a larger circle (ring gear).

The deadbolt 36 is of a length L such that when the deadbolt 36 is not received within a slot 34 of the sprocket ring gear 30, the deadbolt 36 engages a stop 43 on the carrier 38. When the deadbolt 36 is received within the slot 34 the deadbolt 36 does not engage the stop 43 on the carrier 38 as the carrier 38 rotates within the bore 45 of the camshaft ring gear 32. The length of the slot 34 allows the carrier 38 to be stopped at a first stop and a second stop separated by the length. The spring 35 biases the deadbolt 36 into the slot 34. The sides of the pocket 44 are cut to provide as large a contact area as possible, and to prevent the deadbolt 36 from binding in the pocket 44 because of the tipping moment on the deadbolt 36, in this case by being parallel to a centerline of the pocket 44. The angled ends 34*a*, 34*b* of the slot 34 act as a cam mechanism to bias the deadbolt 36 towards the stop 43 on the carrier 38.

Figure 5:
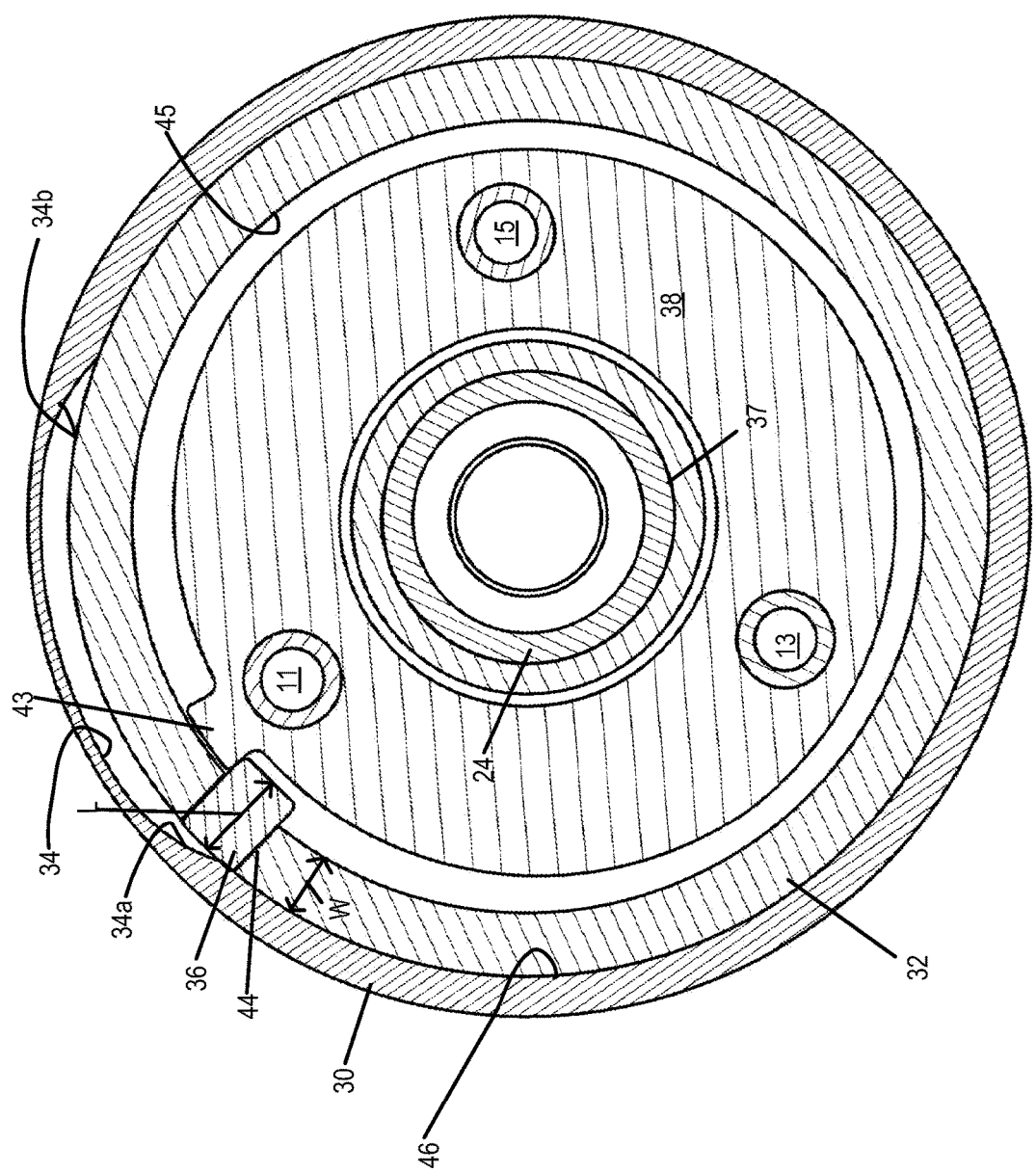
FIG. 5 shows a top section of the carrier engaged at an advance stop of the phaser of a first embodiment of the present invention

When the phaser 10 is in a retard stop position as shown in FIG. 5, a deadbolt 36 in the pocket 44 of the camshaft ring gear 32 is in a position such that the deadbolt 36 engages with a stop 43 on the carrier 38. The deadbolt 36 is spring biased by the spring 35 and by the inner diameter 46*a* of the sprocket ring gear 30. The length L of the deadbolt 36 is greater than the width W of the camshaft ring gear 32, such that a portion of the length L extends into the bore 45 defined by the camshaft sprocket ring gear 32.

After the stop 43 of the carrier 38 engages the deadbolt 36, the carrier 38 and the associated planetary gears 12, 14, 16 can no longer rotate any further in the same direction, and can only turn in the opposite direction. Thus, the phaser 10 is held in a position representing a maximum retard condition.

An engine crankshaft (not shown) is rotationally engaged through a timing chain (not shown) to the sprocket ring gear 30 through a sprocket 54, and the engine camshaft is rotationally engaged to the camshaft ring gear 32. A motor (not shown) is rotationally engaged with the sun gear 24 by way of an output shaft (not shown). When the sun gear 24 is rotated by the motor at the same speed as either of the ring gears 30, 32, since both ring gears 30, 32 rotate in unison, a constant cam phase position is maintained. When the sun gear 24 is driven at a different speed from the ring gears 30, 32 by the motor, a slightly different speed of one ring gear to the other ring gear causes a cam phase shift function. In this way, a very high numerical ratio is obtained and the camshaft is phased either plus or minus from the nominal rotational relationship of the crankshaft to the camshaft.

In the description, phaser rotation is described with respect to the sprocket ring gear 30 as if the sprocket ring gear 30 were stationary, even though during engine operation, all parts of the phaser may be rotating in the same direction as it phases.

The phaser 10 is preferably used to dynamically adjust the rotational relationship of the camshaft to the engine crankshaft either to improve the fuel efficiency of the engine or to provide greater power under load or acceleration.

FIG. 5 shows the phaser 10 with stop 43 of the carrier 38 engaging with the deadbolt 36 of the camshaft sprocket ring gear 30, limiting the travel of the phaser in a first direction to a first stop position (retard). In this position, the engagement of the stop 43 on the carrier 38 with deadbolt 36 within the pocket 44 of the sprocket ring gear 30 halts any further rotation of the camshaft ring gear 32, the sun gear 24 and the carrier 38 in the counterclockwise direction, and halts any further rotation of the planetary gears 12, 14 16 in the clockwise direction. A positive gear ratio is indicated when the camshaft ring gear 32 and the carrier 38 rotate in the same direction towards the angled end 34*a* of the slot 34 as shown.

Figure 6:
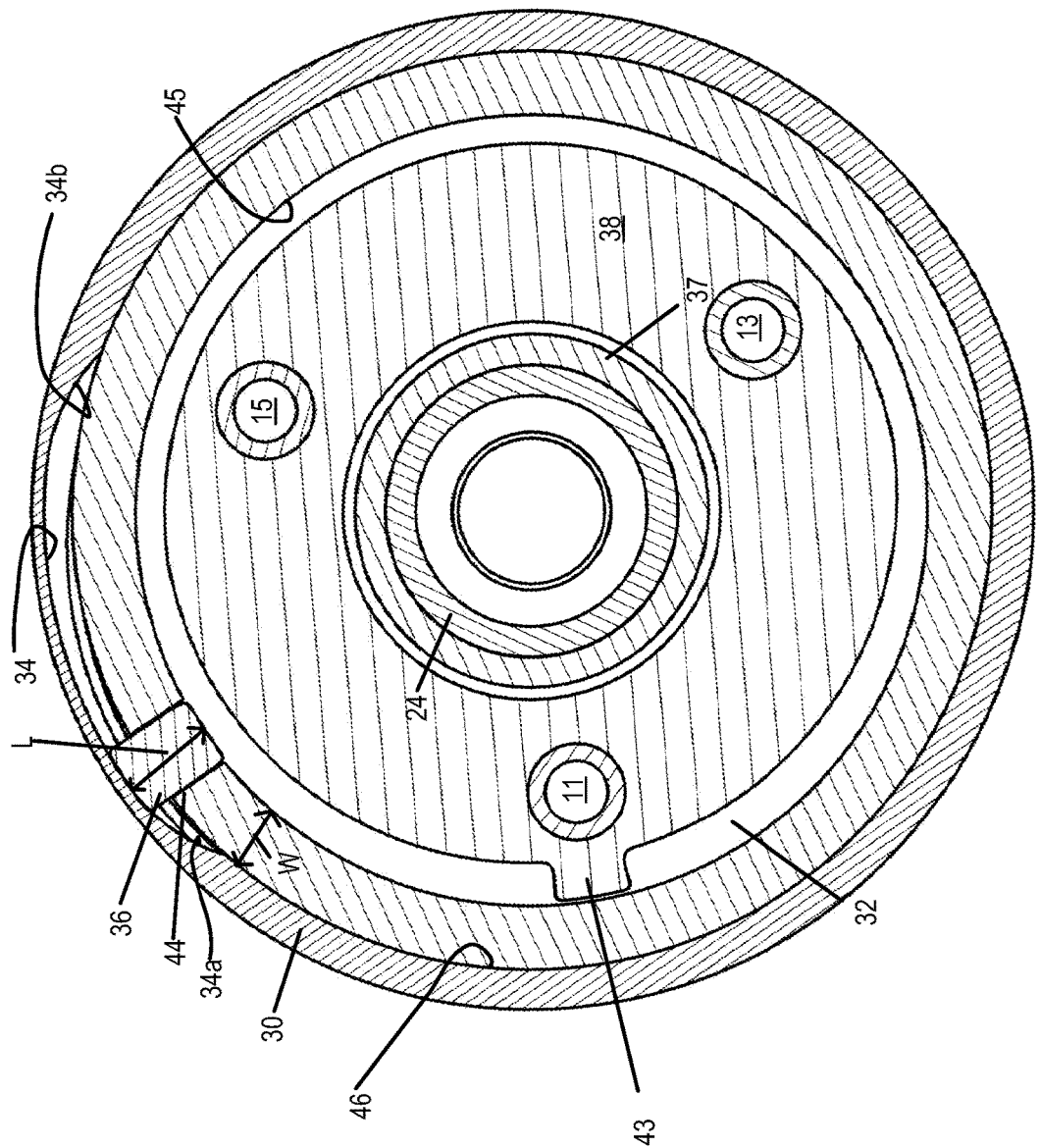
FIG. 6 shows a top section of the carrier approaching or departing an advance stop of the phaser of the first embodiment of the present invention.

FIG. 6 shows a schematic of the phaser 10 after rotation of camshaft ring gear 32, the carrier 38, and the sun gear 24 clockwise. The stop 43 of the carrier 38 does not engage with the deadbolt 36. As the camshaft ring gear 32 rotates, the deadbolt 36 slides along the slot 34 of the sprocket ring gear 30 and the stop 43 of the carrier 38 can rotate past the deadbolt 36.

The rotation of the carrier 38 and the camshaft ring gear 32 is such that the deadbolt 36 does not drop down from the pocket 44 to engage the stop 43 of the carrier 38 until the phaser travel limit is reached. It should be noted that the spring 35 biases the deadbolt 36 towards the slot 34 such that the deadbolt 36 is biased as far into the slot 34 as possible.

Figure 7:
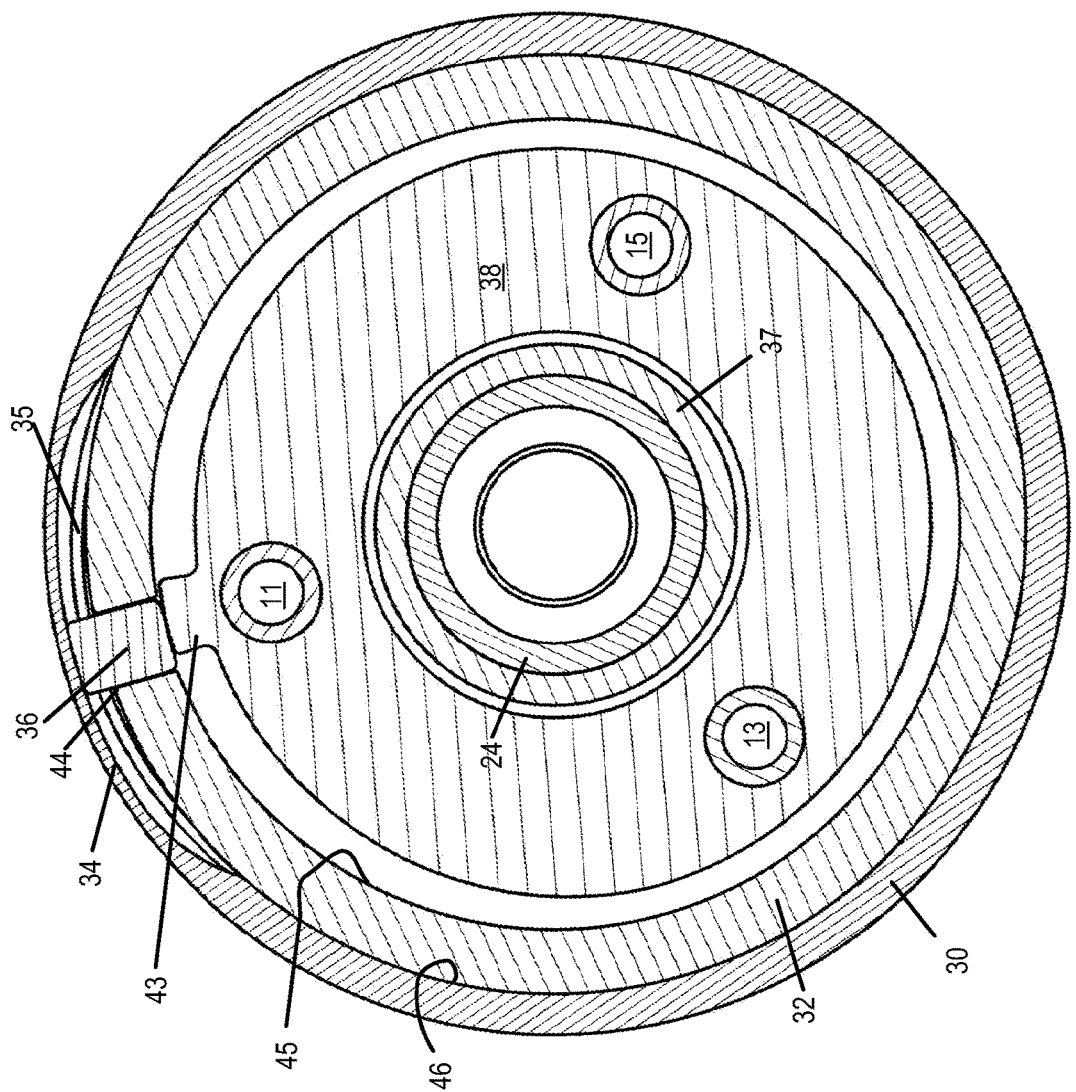
FIG. 7 shows a top section of the carrier at a mid-travel position of the phaser of the first embodiment of the present invention.

FIG. 7 shows the carrier 38 in a mid-travel position. As shown in the figure, the deadbolt 36 is in the slot 34 of the sprocket ring gear 30 and the length L of the deadbolt 36 is not great enough to drop drown far enough into the bore 45 defined by the camshaft ring gear 32 to engage with the stop 43 of the carrier 38. Instead, there is enough clearance between the deadbolt 36 and the stop 43 so that the stop 43 of the carrier 38 can bypass the deadbolt 36.

Figure 8:
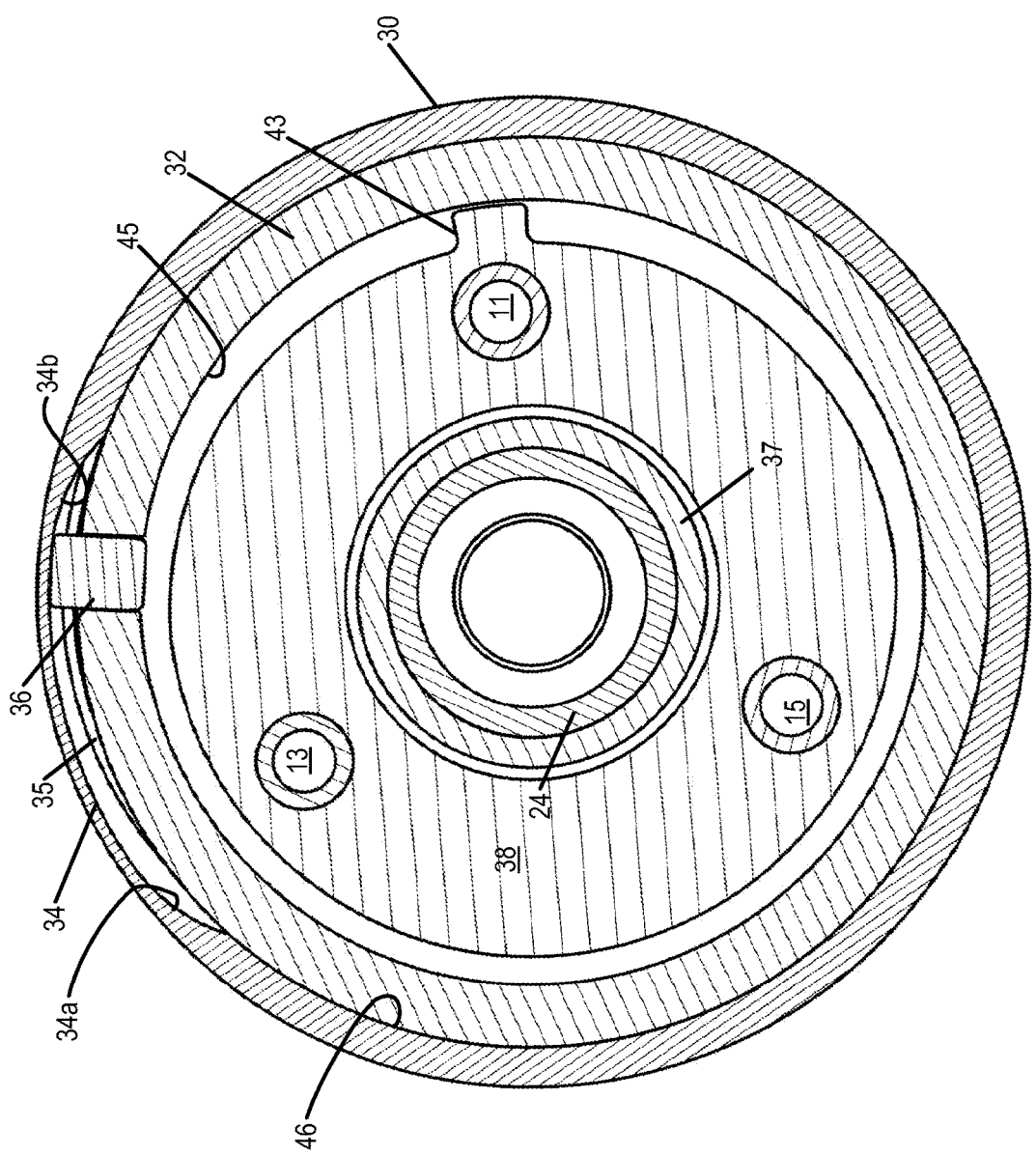
FIG. 8 shows a top section of the carrier approaching or departing a retard stop of the phaser of the first embodiment of the present invention.

FIG. 8 shows the phaser 10 moving towards the advance stop with the carrier 38 and sun gear 24 rotating in the clockwise direction and the ring gears 30, 32 and the planets 12, 14, 16 rotating in the counterclockwise direction. The deadbolt 36 slides along the length of the slot 34 of the sprocket ring gear 30. As the deadbolt 36 continues to slide along the slot 34, the length L of the deadbolt 36 does not extend into the bore 46 of the camshaft ring gear 32 until the carrier 38 is in the last rotation before the end of travel and does not engage the stop 43 of the carrier 38. The angled ends 34*a*, 34*b* are preferably gently sloped and curved over the largest angle available to avoid interference with the stop 43 or other features on the carrier 38 to provide for smooth movement of the stop 43 into the first position.

Figure 9:
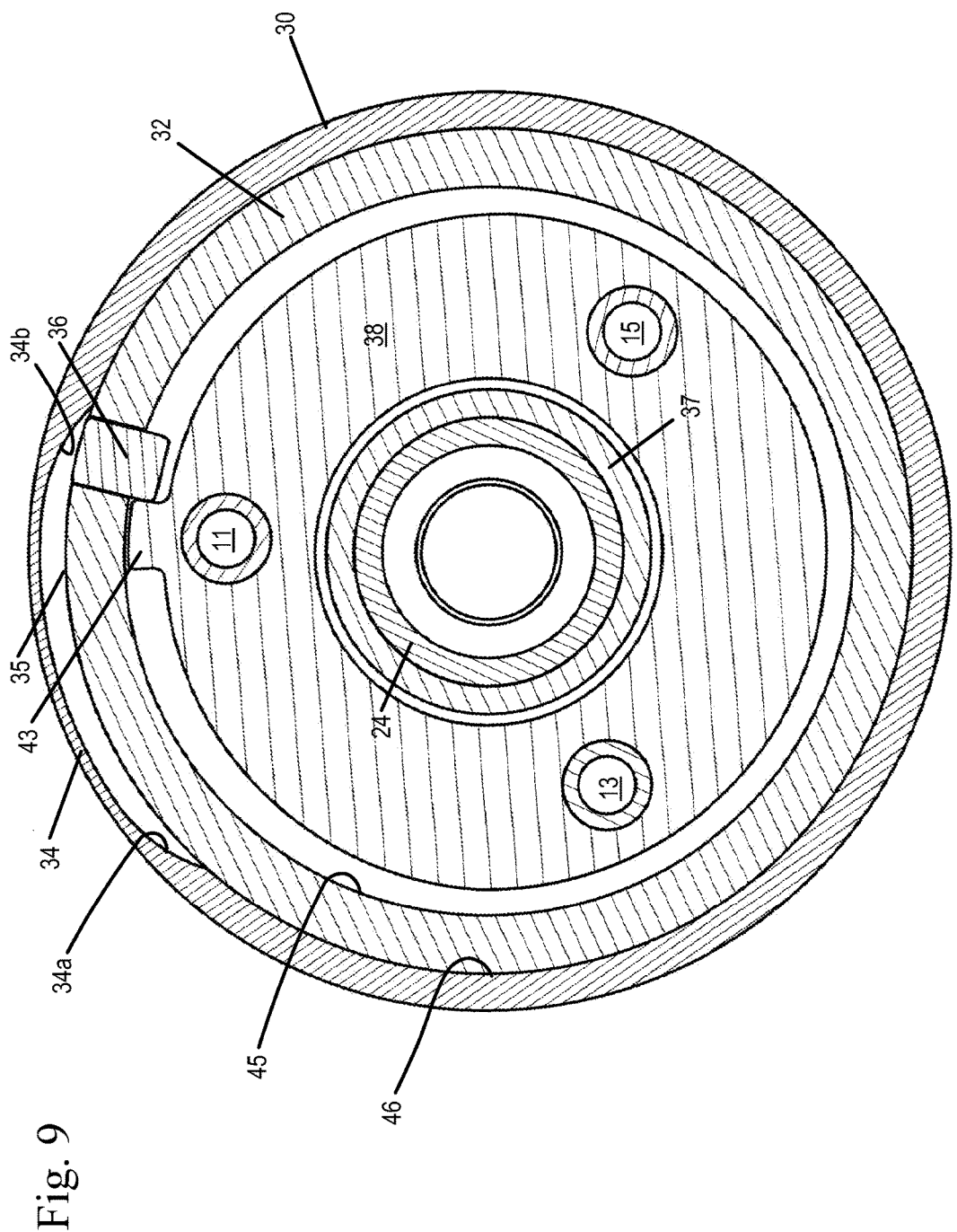
FIG. 9 shows a top section of the carrier engaged at the retard stop of the phaser of the first embodiment of the present invention.
Figure 10:
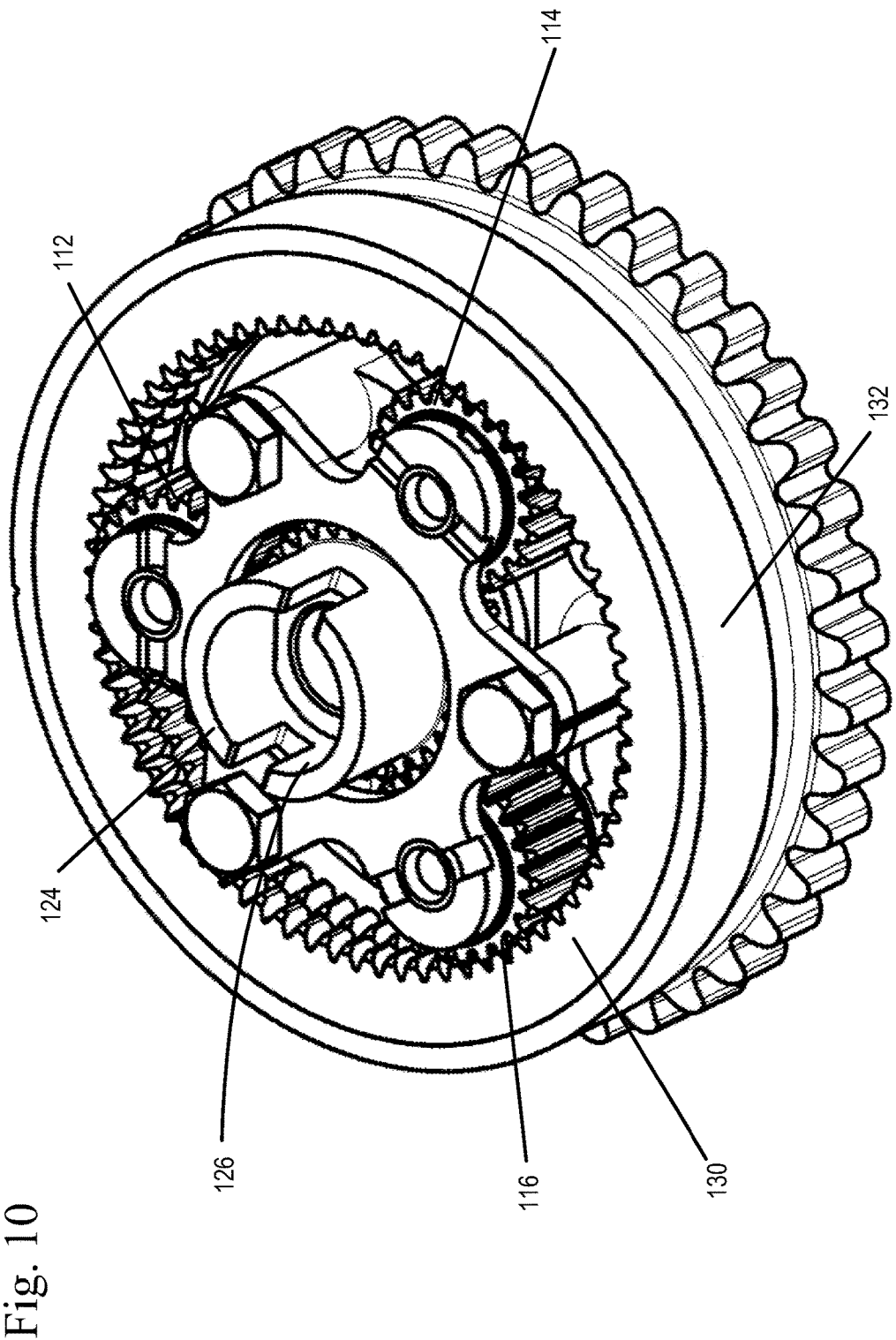
FIG. 10 shows a perspective view of a phaser of a second embodiment of the present invention with a travel end stop of a snap ring stop.
Figure 11:
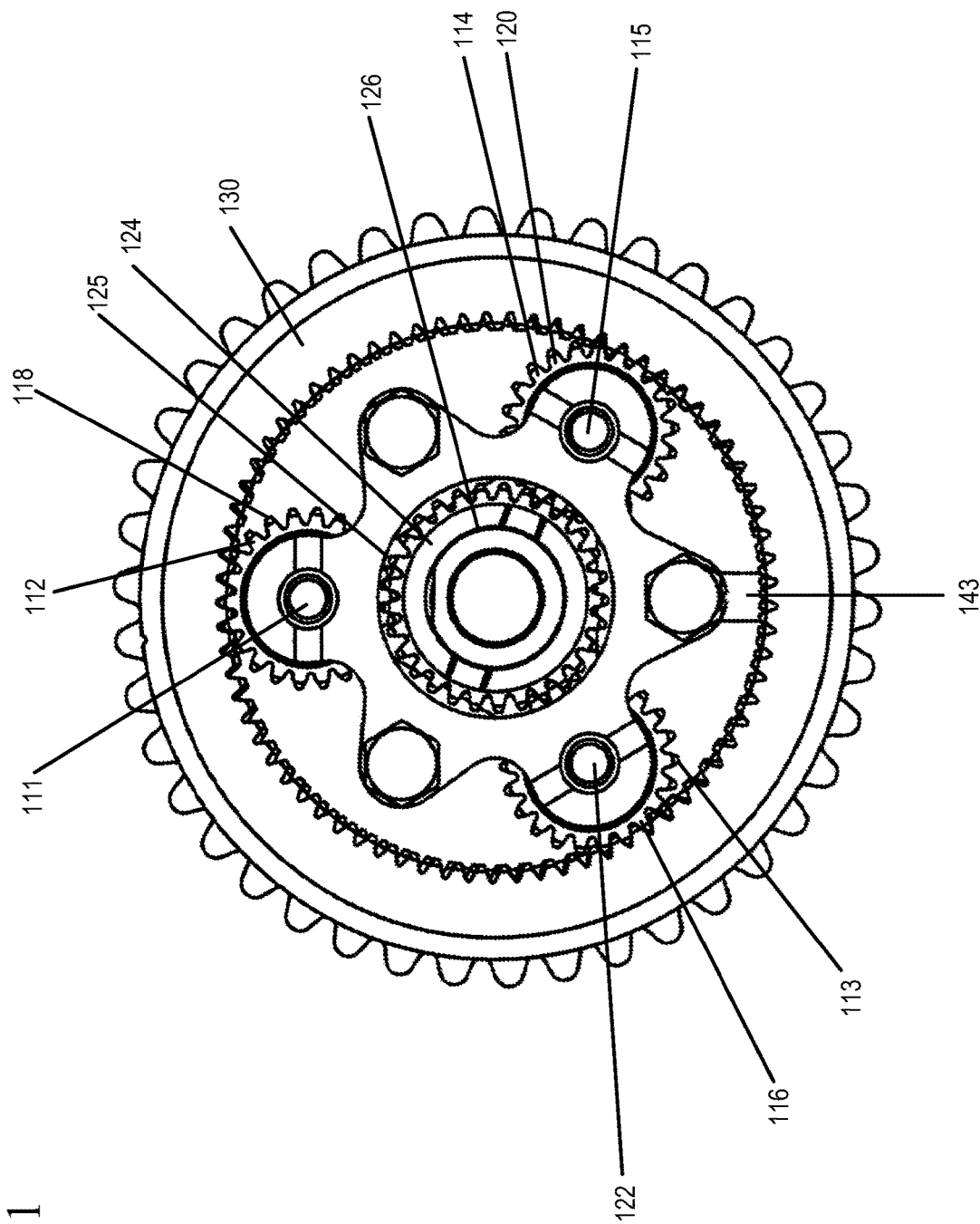
FIG. 11 shows a front view of the phaser of the second embodiment of the present invention.
Figure 12:
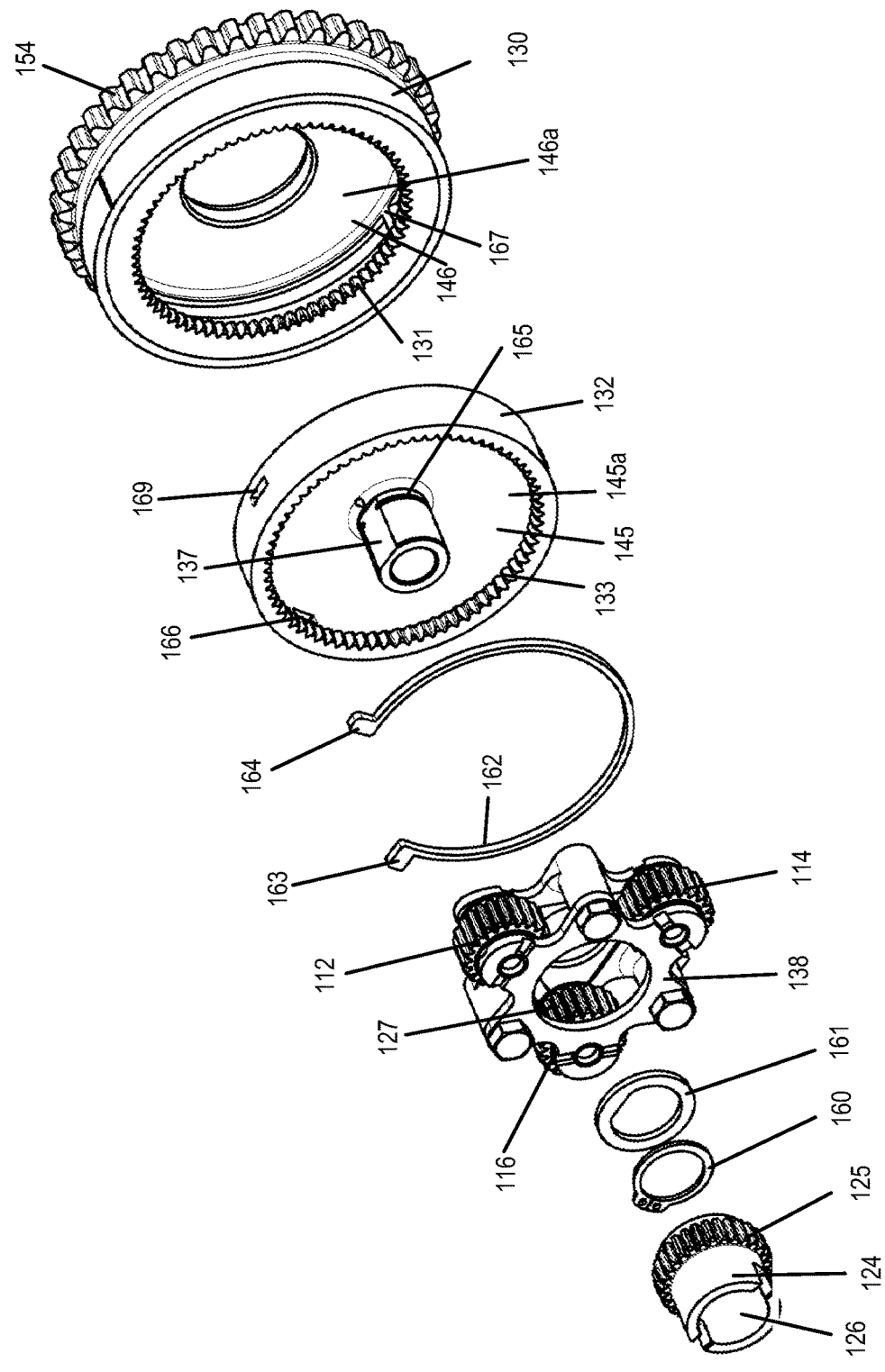
FIG. 12 shows an exploded view of the phaser of the second embodiment of the present invention.

FIG. 9 shows the carrier 38 engaged at the advance stop. In this position, the camshaft ring gear 32 has rotated so that the deadbolt 36 has engaged with the angled end 34b of the slot 34 and the deadbolt 36 extends into the bore 46 of the camshaft ring gear 32. With a portion of the length L of the deadbolt 36 extending into the bore 45 of the camshaft ring gear 32, as the carrier 38 rotates in the clockwise direction, the stop 43 of the carrier 38 continues to rotate in the clockwise direction until the stop 42 of the carrier 38 engages with the deadbolt 36, preventing further movement of the carrier 38 in the clockwise direction.

From the advance stop, the camshaft ring gear 32, the carrier 38, and the sun gear 24 rotate in a counterclockwise direction, and the planet gears 12, 14, 16 rotate in the clockwise direction until the stop 43 of the carrier 38 engages with the deadbolt 36.

FIGS. 10-17 show a phaser of a second embodiment of the present invention with a travel end stop of a snap ring stop.

The phaser 110 has a split ring gear planetary drive which includes planet gears 112, 114, 116 with planet gear teeth 118, 120, 122, a centrally located sun gear 124 with sun gear teeth 125, and a split ring gear including a sprocket ring gear 130 and a camshaft ring gear 132.

The sun gear 124 has a bore 126 for receiving an output shaft (not shown).

The planet gears 112, 114, 116 are held together by a carrier 138. The carrier 138 has a first plate 139 and a second plate 140. Each planet gear 112, 114, 116 is connected to a first plate 139 and a second plate 140 which makes up the carrier 138 through pins 111, 113, 115 in which the planet gears 112, 114, 116 rotate. The carrier 138 has a centrally located bore 127 for receiving the sun gear 124. The sun gear teeth 125 of the sun gear 124 are aligned with and engage the planet gear teeth 118, 120, 122. The carrier 138 also has a stop 143.

The carrier 138 and associated planet gears 112,114, 116 are received within an inner diameter 145a defining a bore 145 of the camshaft ring gear 132. The camshaft ring gear 132 has a first hole 166 for receiving a first end 163 of a snap ring 162 and a second hole 169 for receiving the second end 164 of the snap ring 162. The snap ring 162 is resilient and the ends 163, 164 of the snap ring 162 are biased radially outward. The snap ring 162 is kept in place axially within the inner diameter 145a of the bore 145 of the camshaft ring gear 132 by the ring gear teeth 133 or a groove (not shown). The carrier 138 may be kept in place axially by retaining ring 160 and a washer 161 received within a slot 165 in the centrally located flange 137 of the camshaft ring gear 132.

The camshaft ring gear 132 is received by a bore 146 formed by an inner diameter 146a of the sprocket ring gear 130. The outer circumference of the spring ring gear 130 contains sprocket teeth 154. A portion of an inner diameter 146a of the sprocket ring gear 130 contains ring gear teeth 131.

On the inner diameter 146a of the sprocket ring gear 130 is a cam mechanism 167. The cam mechanism 167 is preferably integrally formed with the sprocket ring gear 130, although it could be a separate piece inserted into the sprocket ring gear 130. The cam mechanism 167 rotates with the sprocket ring gear 130. The cam mechanism 167 is spaced at an interval along an inner diameter 146a of the sprocket ring gear 130.

The ring gears 130, 132 have different numbers of teeth 131, 133, where the difference in the number of teeth is a multiple of the number of planet gears 112, 114, 116. The ring gear teeth 131, 133 have profiles to allow the ring gears 130, 132 to mesh properly with the planet gears 112, 114, 116.

The planetary gears 112, 114, 116 rotate around the sun gear 124 and within the ring gears 130, 132 such that the planetary gears 112, 114, 116 travel along hypocycloid curves, a curve generated by the trace of a fixed point on a small circle (planetary gear) that rolls within a larger circle (ring gear).

Figure 13:
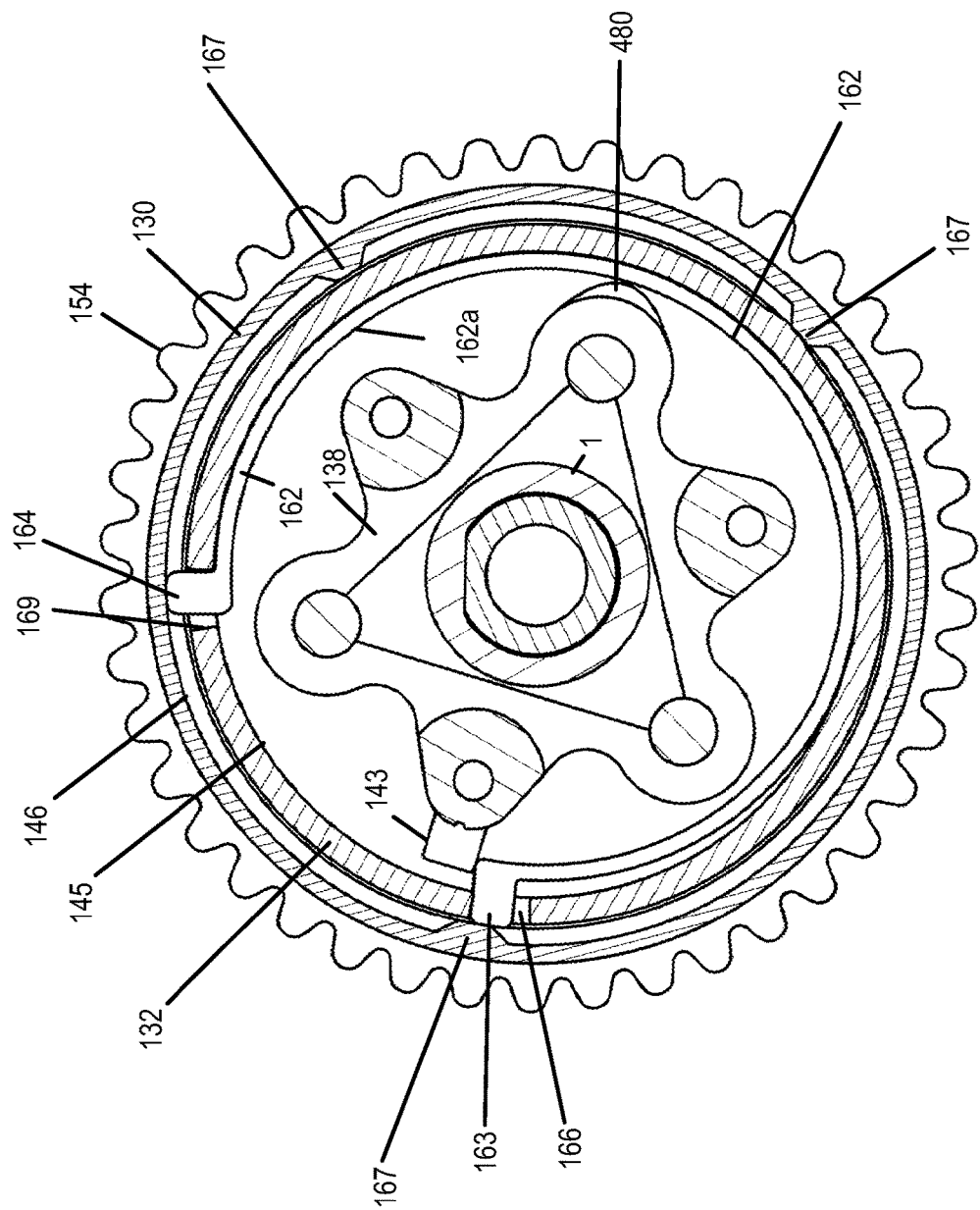
FIG. 13 shows a top section of the carrier engaged at an advance stop of the phaser of a second embodiment of the present invention

When the phaser is in an advanced stop position as shown in FIG. 13, the stop 143 on the carrier 138 is engaged with a first end 163 of the snap ring 162 which is engaged with the slot 166 of the camshaft ring gear 132.

After the stop 143 of the carrier 138 engages the first end 163 of the snap ring 162, the carrier 138 and the associated planetary gears 112, 114, 116 can no longer rotate any further in the same direction, and can only turn in the opposite direction. Thus, the phaser 110 is held in a position representing a maximum advanced condition.

An engine crankshaft (not shown) is rotationally engaged through a timing chain (not shown) to the sprocket ring gear 130 through a sprocket 154, and the engine camshaft is rotationally engaged to the camshaft ring gear 132. A motor (not shown) is rotationally engaged with the sun gear 124 by way of an output shaft (not shown). When the sun gear 124 is rotated by the motor at the same speed as either of the ring gears 130, 132, since both ring gears 130, 132 rotate in unison, a constant cam phase position is maintained. When the sun gear 124 is driven at a different speed from the ring gears 130, 132 by the motor, a slightly different speed of one ring gear to the other ring gear causes a cam phase shift function. In this way, a very high numerical ratio is obtained and the camshaft is phased either plus or minus from the nominal rotational relationship of the crankshaft to the camshaft.

The phaser 110 is preferably used to dynamically adjust the rotational relationship of the camshaft to the engine crankshaft either to improve the fuel efficiency of the engine or to provide greater power under load or acceleration.

FIG. 13 shows the phaser 110 with stop 143 of the carrier 138 engaging with the first end 163 of the snap ring 162 engaged with the slot 166 of the camshaft sprocket ring gear 130, limiting the travel of the phaser in a first direction to a first stop position (advanced). In this position, the first end 163 of the snap ring 162 is pushed inwards towards the carrier 138 by a cam mechanism 167 of the sprocket ring gear 130. The movement of the first end 163 of the snap ring 162 inwards towards the sun gear 124 ensures that the first end 163 of the snap ring 162 engages with the stop 143 on the carrier 138 and halts any further rotation of the camshaft ring gear 132 clockwise, and halts any further rotation of the planetary gears 112, 114, 116 in the clockwise direction and halts any rotation of the carrier 138 and the sun gear 124 in the counterclockwise direction.

Figure 14:
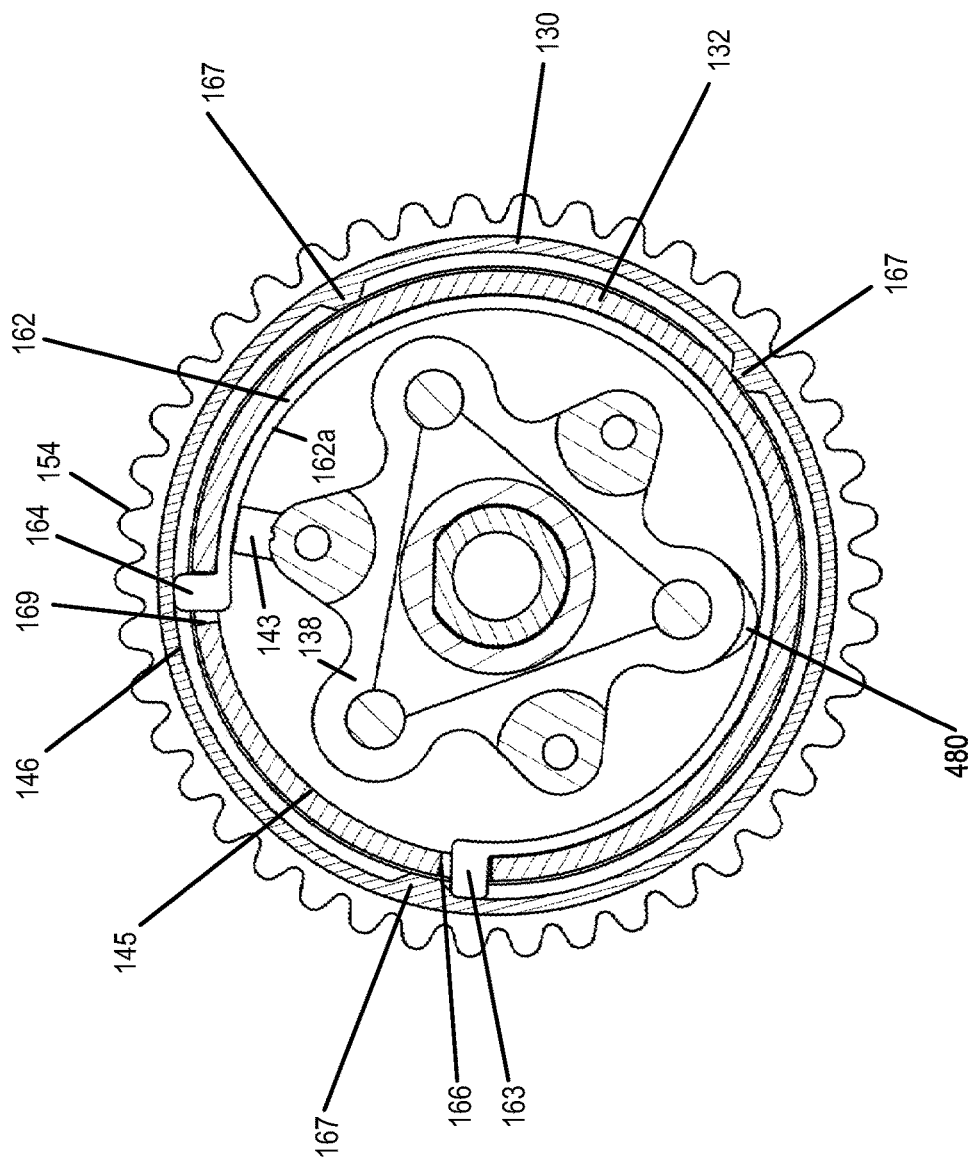
FIG. 14 shows a top section of the carrier approaching or departing an advance stop of the phaser of the second embodiment of the present invention.

FIG. 14 shows a schematic of the phaser 110 after rotation of the carrier 138 and the sun gear 124. The camshaft ring gear 132 rotates in a counterclockwise direction, the sun gear 124 and the carrier 138 rotate clockwise, and the planetary gears 112, 114, 116 rotate in the counterclockwise direction. The cam mechanism 167 of the sprocket ring gear 130 is in a position such that the first end 163 or second end 164 of the snap ring 162 does not engage the cam mechanism 167. Therefore, the stop 143 of the carrier 167 does not engage with the either of the ends 163, 164 of the snap ring 162. As the camshaft ring gear 132 rotates, the stop 143 of the carrier 138 slides on or has clearance to an interior 162a of the snap ring 162, and the stop 143 of the carrier 138 rotates past the second end 164 of the snap ring 162. The rotation of the carrier 138 and the ring gears 130, 132 is such that the first and second ends 163, 164 of the snap ring 162 do not engage the stop 143 of the carrier 138 until the phaser travel limit is reached.

Figure 15:
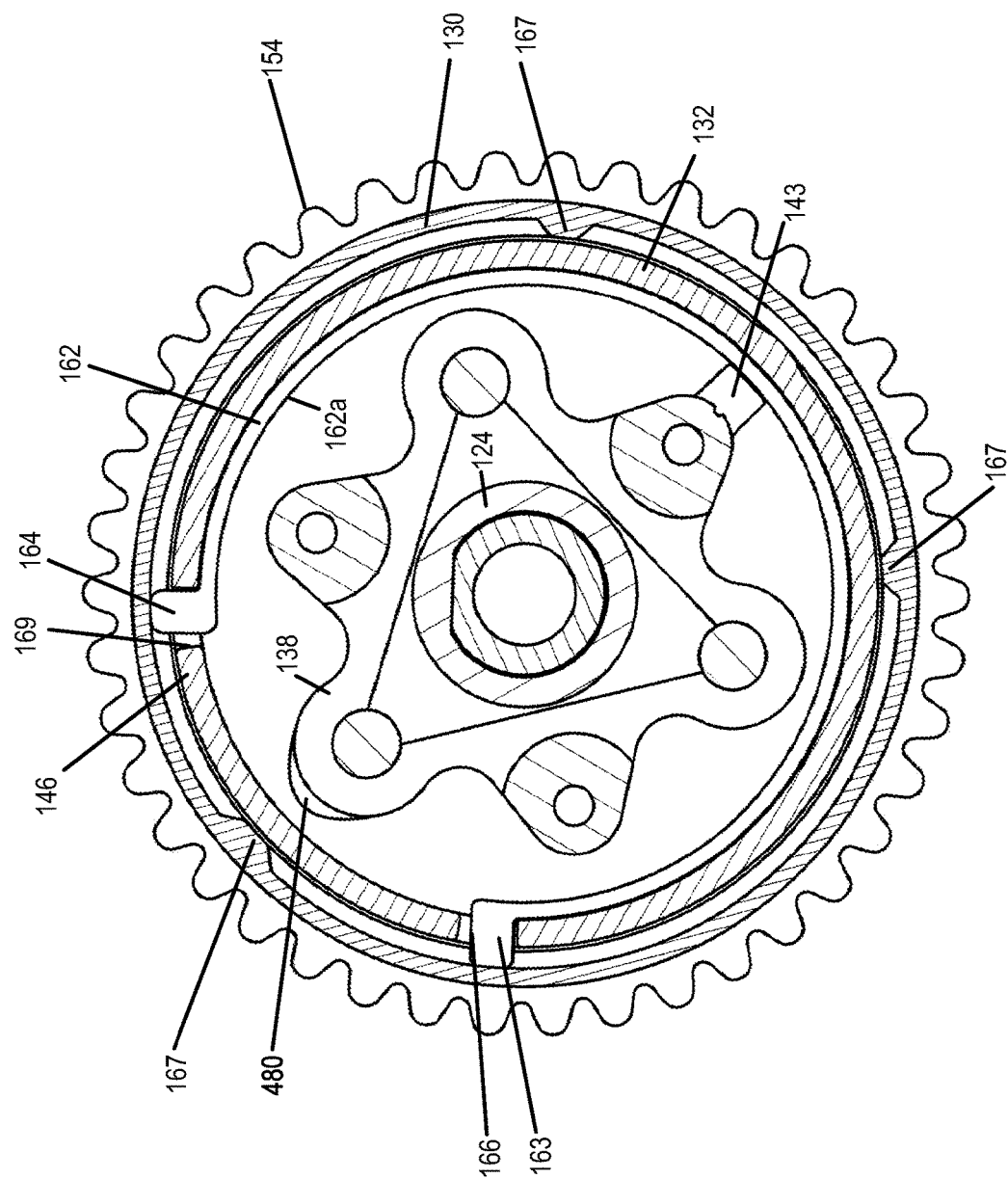
FIG. 15 shows a top section of the carrier at a mid-travel position of the phaser of the second embodiment of the present invention.

FIG. 15 shows the carrier 138 in a mid-travel position. As shown in the figure, the first and second ends 163, 164 of the snap ring 162 do not engage the cam mechanism 167 of the sprocket ring gear 130 and the stop 143 on the carrier 138 continues to slide on or rotate with clearance to an interior 162a of the ring portion 162b of the snap ring 162.

Figure 16:
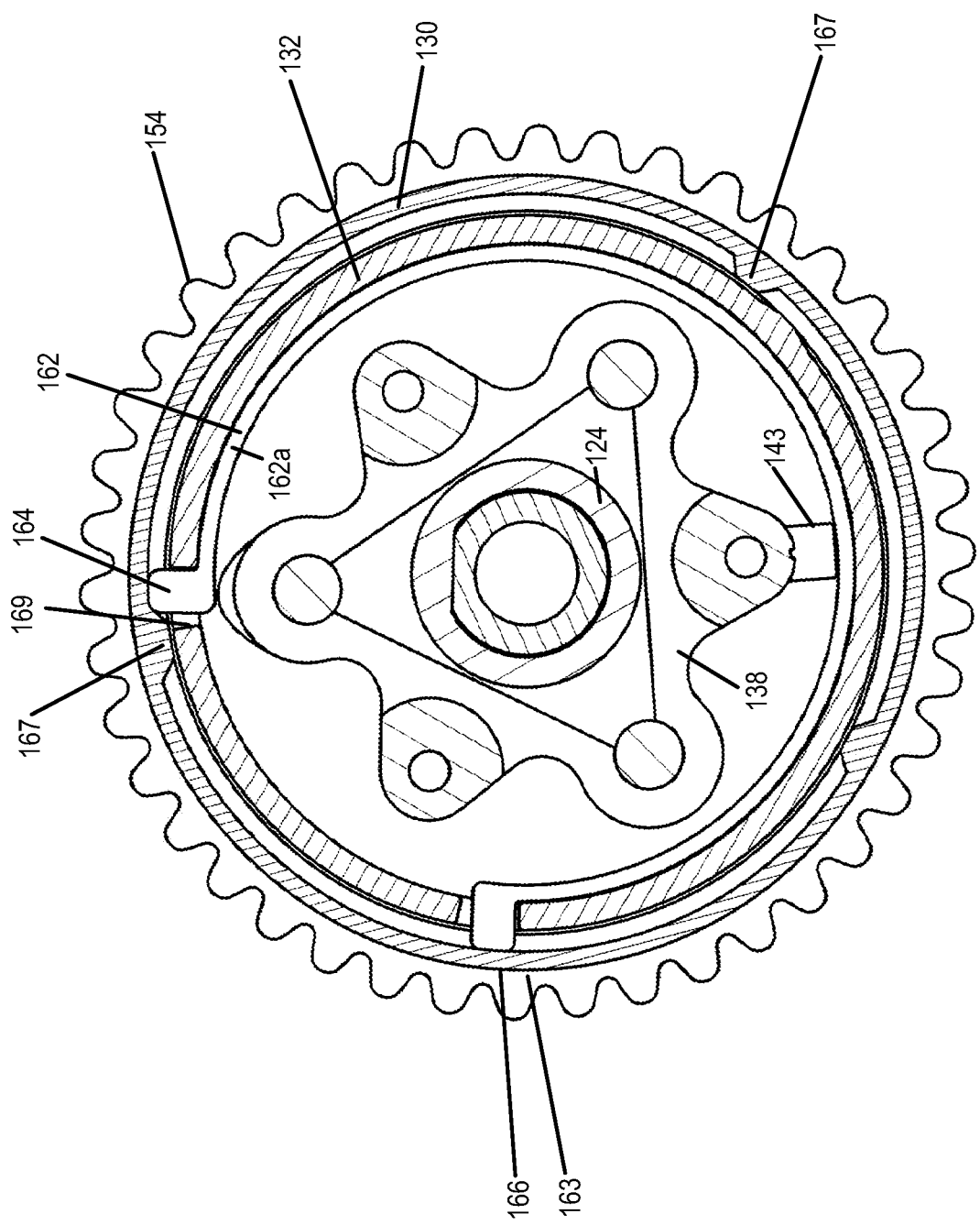
FIG. 16 shows a top section of the carrier approaching or departing a retard stop of the phaser of the second embodiment of the present invention.

FIG. 16 shows the phaser moving towards the retard stop with the carrier 138 and the sun gear 124 rotating in the clockwise direction and the camshaft ring gear 132 and the planetary gears 112, 114, 116 rotating in the counterclockwise direction. The cam mechanism 167 of the sprocket ring gear 130 is now in a position such that neither the first end 163 nor the second end 164 of the snap ring 162 engages the cam mechanism 167. Therefore, the stop 143 of the carrier 138 does not engage with the either of the ends 163, 164 of the snap ring 162 between the first and second stop positions. As the camshaft ring gear 132 rotates, the stop 143 of the carrier 138 slides on or rotates with clearance to an interior 162a of the snap ring 162, and the stop 143 of the carrier 138 rotates past the first and second ends 163, 164 of the snap ring 164. The rotation of the carrier 138 and the ring gears 130, 132 is such that the first and second ends 163, 164 of the snap ring 162 do not engage the stop 143 of the carrier 138 until the phaser travel limit is reached.

Figure 17:
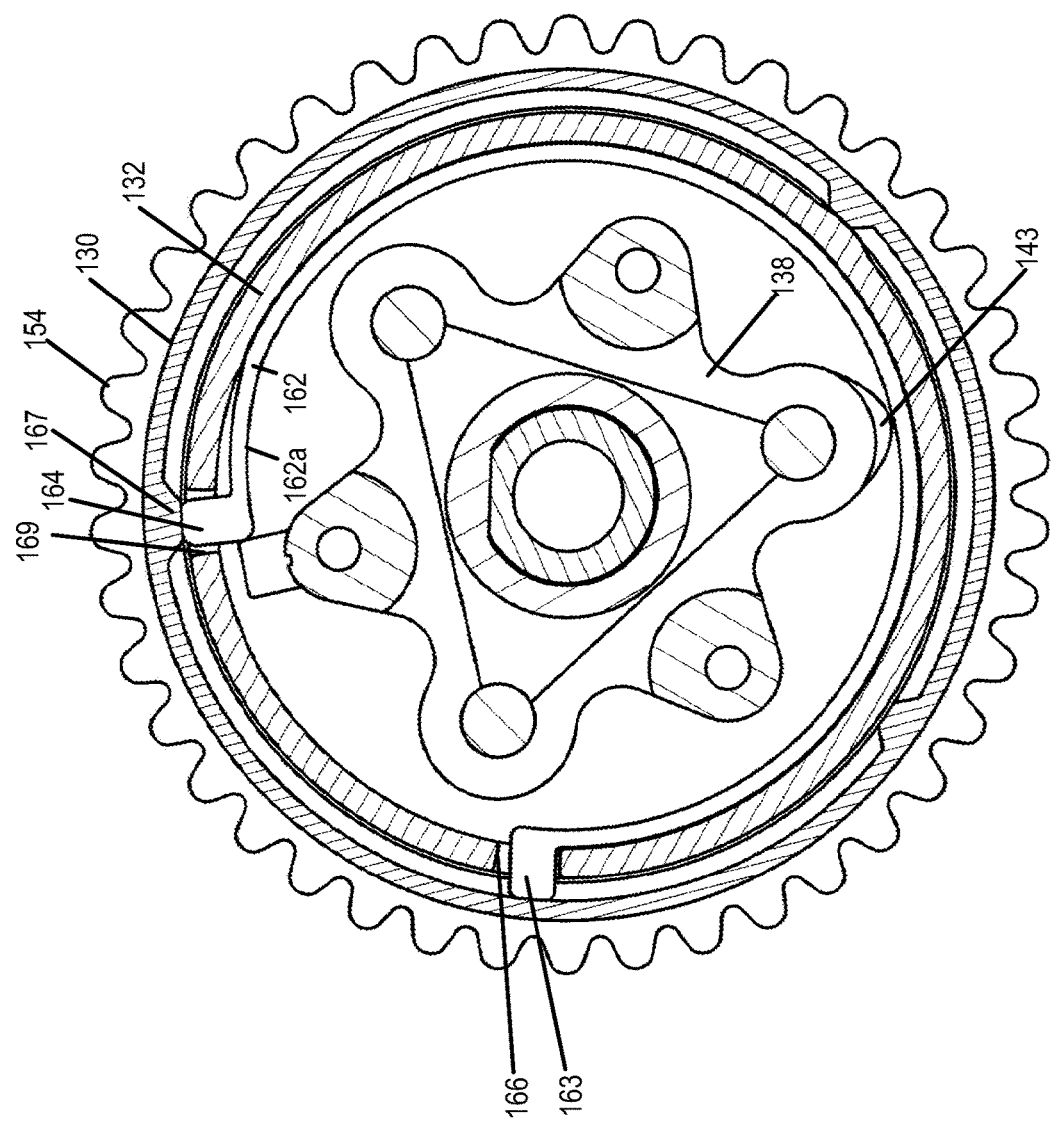
FIG. 17 shows a top section of the carrier engaged at the retard stop of the phaser of the second embodiment of the present invention.
Figure 18:
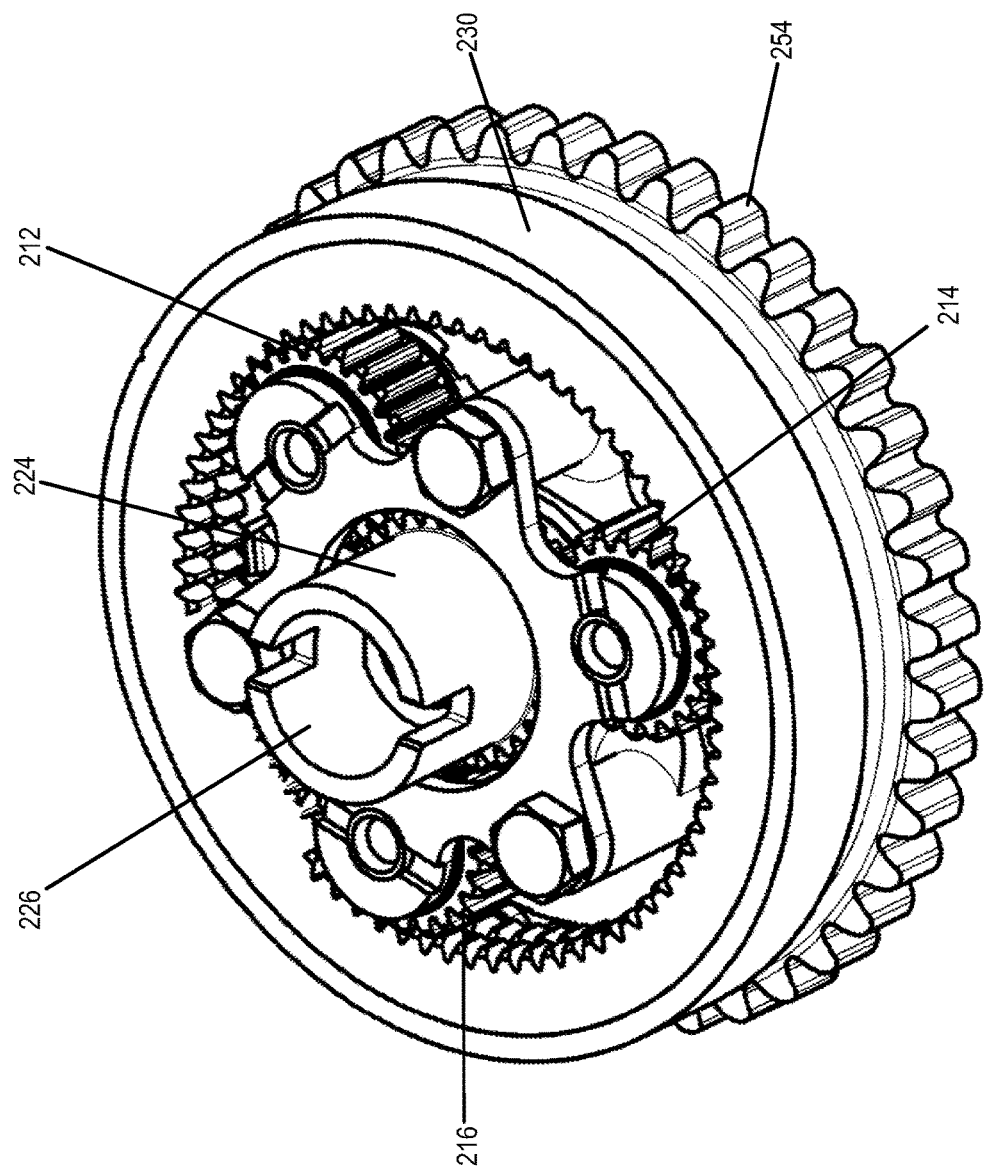
FIG. 18 shows a perspective view of a phaser of a third embodiment of the present invention with a travel end stop of a pivoting pawl stop.
Figure 19:
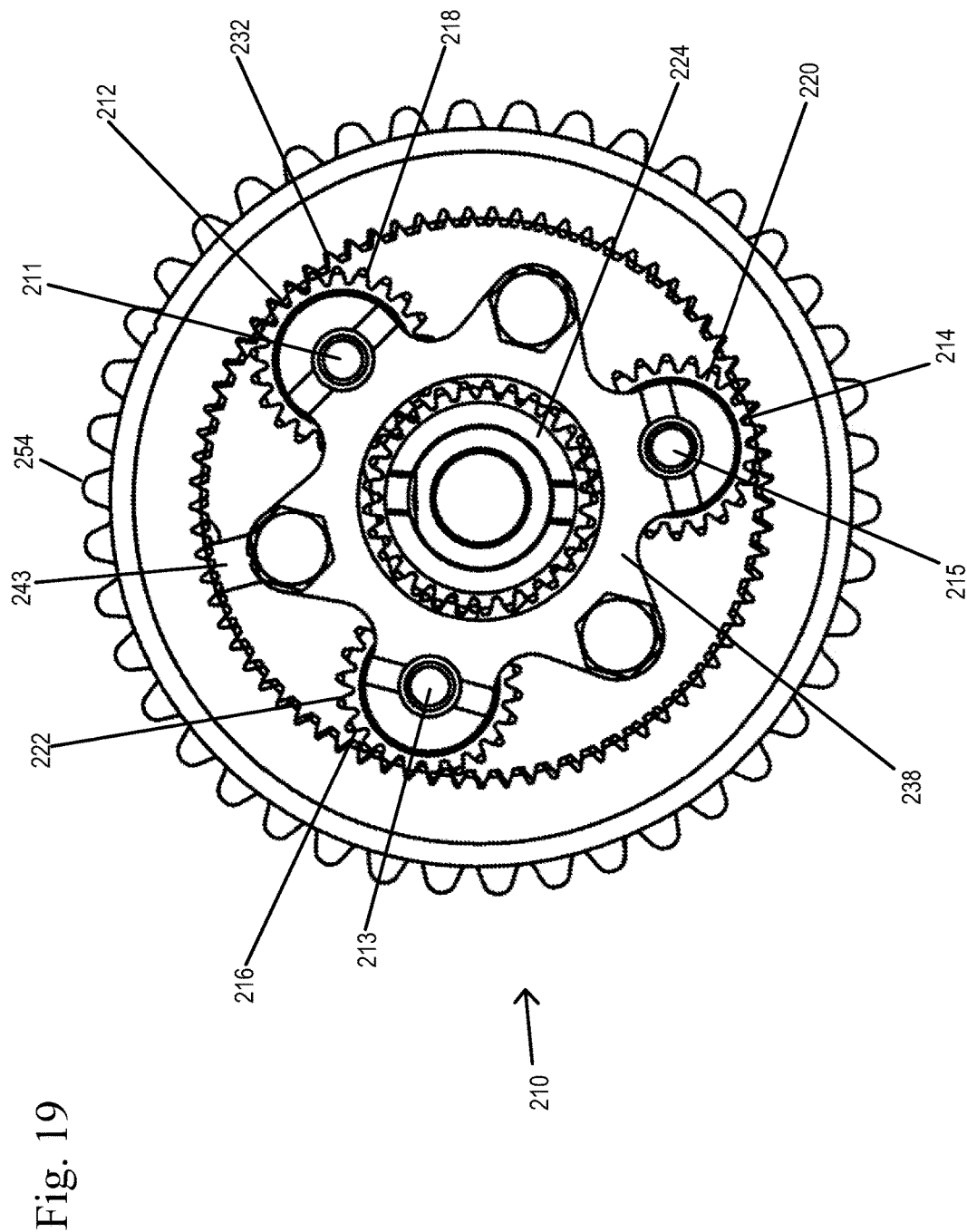
FIG. 19 shows a front view of the phaser of the third embodiment of the present invention.
Figure 20:
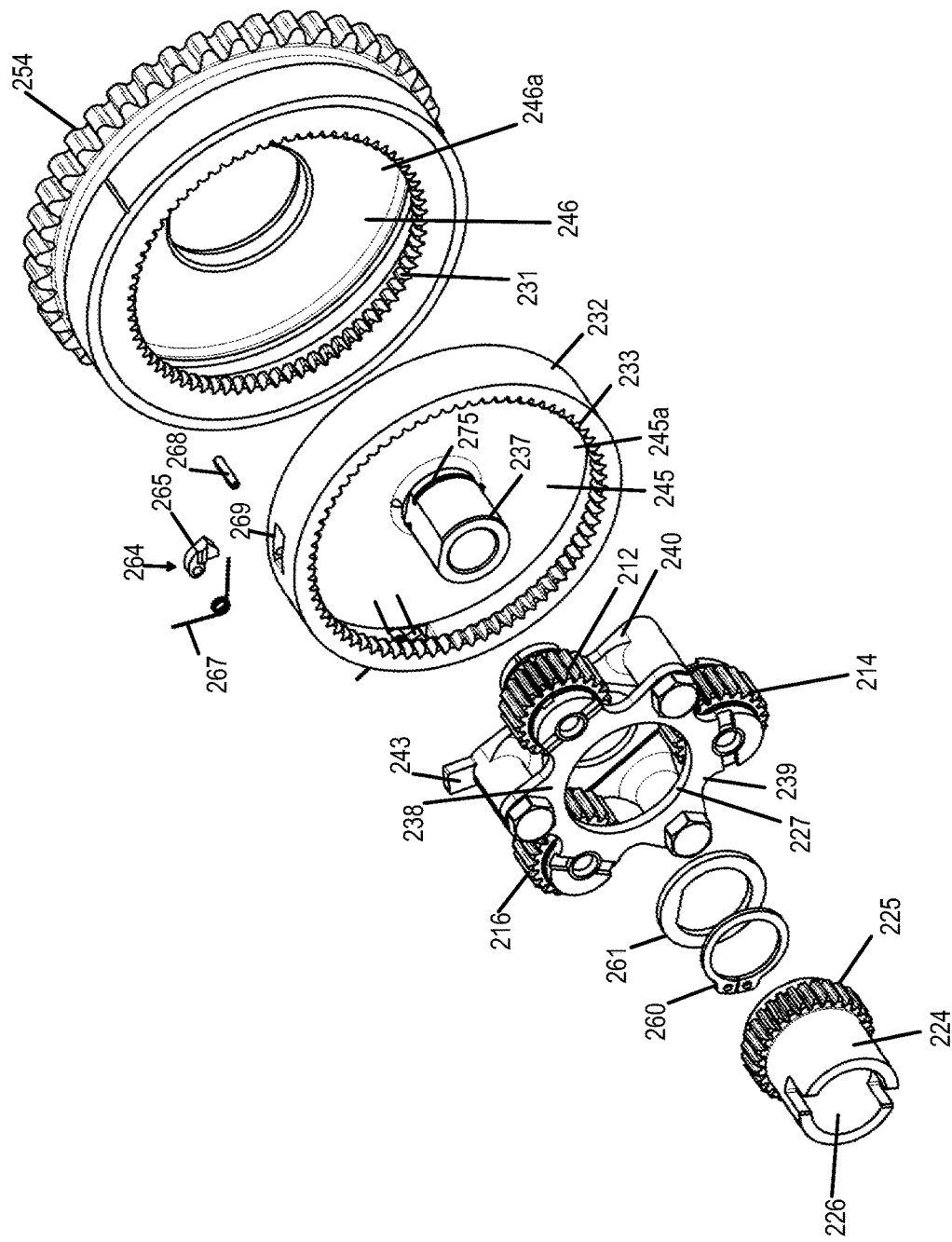
FIG. 20 shows an exploded view of the phaser of the third embodiment of the present invention.

FIG. 17 shows the carrier 138 engaged at the retard stop. The second end 164 of the snap ring 162 engages a cam mechanism 167 on the sprocket ring gear 130. The engagement of the second end 164 of the snap ring 162 with the cam mechanism 167 pushes the second end 164 of the snap ring 162 inwards towards the carrier 138, so that as the carrier 138 rotates clockwise direction, the stop 143 of the carrier 138 engages the second end 164 of the snap ring 162, preventing further rotation or movement of the carrier 138 in the clockwise direction.

The sprocket ring gear 130 may be constructed with multiple cam mechanisms 167 of different lengths so that the ends 163, 164 of the snap ring 162 are moved to engage the carrier stop 143 at different angles to define different ranges of authority for the phasers using a common sprocket ring gear 130 dependent only on how the camshaft ring gear 132 and the carrier 138 are assembled. Although a negative gear ratio is shown in this embodiment, a positive gear ratio may be used and similarly the spacing between cam mechanisms 167 may be used to define a variety of ranges of authority.

FIGS. 18-25 show a phaser of a third embodiment of the present invention with a travel end stop of a pivoting pawl stop.

The phaser 210 has a split ring gear planetary drive which includes planet gears 212, 214, 216 with planet gear teeth 218, 220, 222, a centrally located sun gear 224 with sun gear teeth 225, and a split ring gear including a sprocket ring gear 230 and a camshaft ring gear 232.

The sun gear 224 has a bore 226 for receiving an output shaft (not shown).

The planet gears 212, 214, 216 are held together by a carrier 238. The carrier 238 has a first plate 239 and a second plate 240. Each planet gear 212, 214, 216 is connected to the first plate 239 and the second plate 240 which makes up the carrier 238 through pins 211, 213, 215 in which the planet gears 212, 214, 216 rotate. The carrier 238 has a centrally located bore 227 for receiving the sun gear 224. The sun gear teeth 225 are aligned with and engage the planet gear teeth 218, 220, 222. The carrier 238 also has a stop 243. The carrier 238 is kept in place axially by a retaining ring 260 and washer 261 received within a slot 275 in the centrally located flange 237 of the camshaft ring gear 232.

The carrier 238 and associated planet gears 212, 214, 216 are received within an inner diameter 245a defining a bore 245 of the camshaft ring gear 232. The camshaft ring gear 232 has a first hole 266 for receiving a first spring biased pivoting pawl 263 and a second hole 269 for receiving the second spring biased pivoting pawl 264. The first and second spring biased pivoting pawls 263, 264 include a pawl 265, a spring 267, and a pin 268 in which the pawls 265 pivots on. The pivoting pawls 263, 264 have a second position in which the pawl 265 is contained within the ring gears 230, 232 and a first position in which the pawl 265 is pivoted on the pin 268, such that at least a portion of the pawl 265 is present in the inner diameter 245a of the camshaft ring gear 232 and can interfere with the travel of the carrier 238 as it rotates. The spring 267 biases the pawl 265 towards the sprocket ring gear 230. Also present on the inner diameter 245a of the camshaft ring gear 232 is a set of ring gear teeth 233.

The camshaft ring gear 232 is received by a bore 246 formed by an inner diameter 246a of the sprocket ring gear 230. The outer circumference of the spring ring gear 230 contains sprocket teeth 254. A portion of an inner diameter 246a of the sprocket ring gear 230 contains ring gear teeth 231.

On the inner diameter 246a of the sprocket ring gear 230 is a cam mechanism 267. The cam mechanism 267 is spaced at an interval along an inner diameter 246a of the sprocket ring gear 230. The ring gears 230, 232 have different numbers of teeth 231, 233, where the difference in the number of teeth is a multiple of the number of planet gears 212, 214, 216. The ring gear teeth 231, 233 have profiles to allow the ring gears 230, 232 to mesh properly with the planet gears 212, 214, 216.

The planetary gears 212, 214, 216 rotate around the sun gear 224 and within the ring gears 230, 232 such that the planetary gears 212, 214, 216 travel along hypocycloid curves, a curve generated by the trace of a fixed point on a small circle (planetary gear) that rolls within a larger circle (ring gear).

Figure 21:
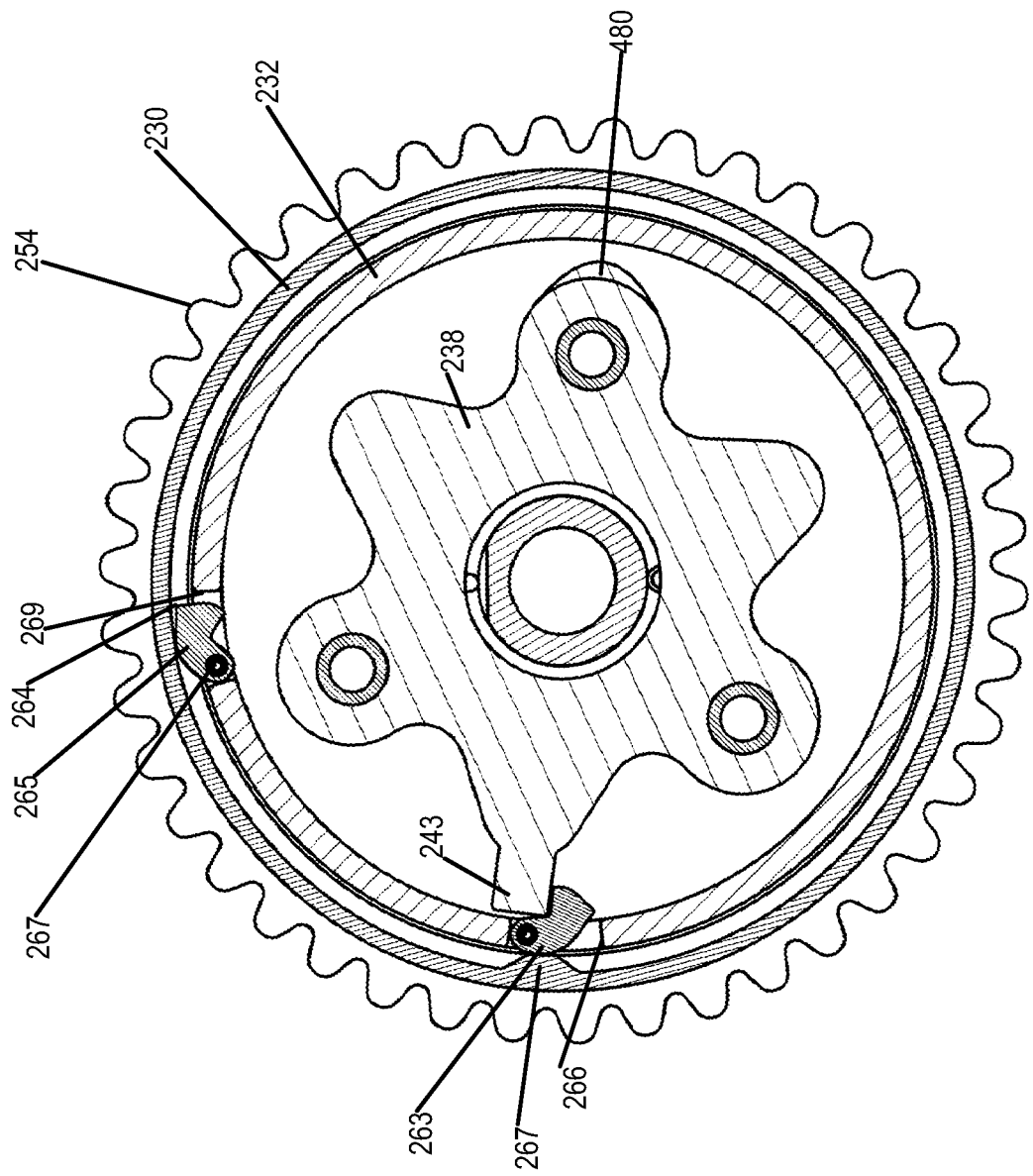
FIG. 21 shows a top section of the carrier engaged at an advance stop of the phaser of a third embodiment of the present invention

When the phaser 210 is in an advanced stop position as shown in FIG. 21, the stop 243 on the carrier 238 is engaged with a first spring biased pivoting pawl 263.

After the stop 243 of the carrier 238 engages the first spring biased pivoting pawl 263, the planetary gear 214 can no longer rotate any further in the same direction, and can only turn in the opposite direction. Thus, the phaser 210 is held in a position representing a maximum advanced condition.

An engine crankshaft (not shown) is rotationally engaged through a timing chain (not shown) to the sprocket ring gear 230 through a sprocket 254, and the engine camshaft is rotationally engaged to the camshaft ring gear 232. A motor (not shown) is rotationally engaged with the sun gear 224 by way of an output shaft (not shown). When the sun gear 224 is rotated by the motor at the same speed as either of the ring gears 230, 232, since both ring gears 230, 232 rotate in unison, a constant cam phase position is maintained. When the sun gear 224 is driven at a different speed from the ring gears 230, 232 by the electric motor, a slightly different speed of one ring gear to the other ring gear causes a cam phase shift function. In this way, a very high numerical ratio is obtained and the camshaft is phased either plus or minus from the nominal rotational relationship of the crankshaft to the camshaft.

The phaser 210 is preferably used to dynamically adjust the rotational relationship of the camshaft to the engine crankshaft either to improve the fuel efficiency of the engine or to provide greater power under load or acceleration.

FIG. 21 shows the phaser 210 with stop 243 of the carrier 238 engaging with the first spring biased pawl 263 within the slot 266 of the camshaft sprocket ring gear 230, limiting the travel of the phaser in a first direction to a first stop position (advanced).

In this position, the first spring biased pawl 263 is pushed inwards towards the carrier 238 by a cam mechanism 267 of the sprocket ring gear 230. The movement of the first spring biased pawl 263 inwards ensures that the first spring biased pawl 263 engages with the stop 243 on the carrier 238 and halts any further rotation of the camshaft ring gear 230 clockwise, and halts any further rotation of the planetary gears 212, 214, 216 in the clockwise direction and halts any rotation of the carrier 238 and the sun gear 224 in the counterclockwise direction.

Figure 22:
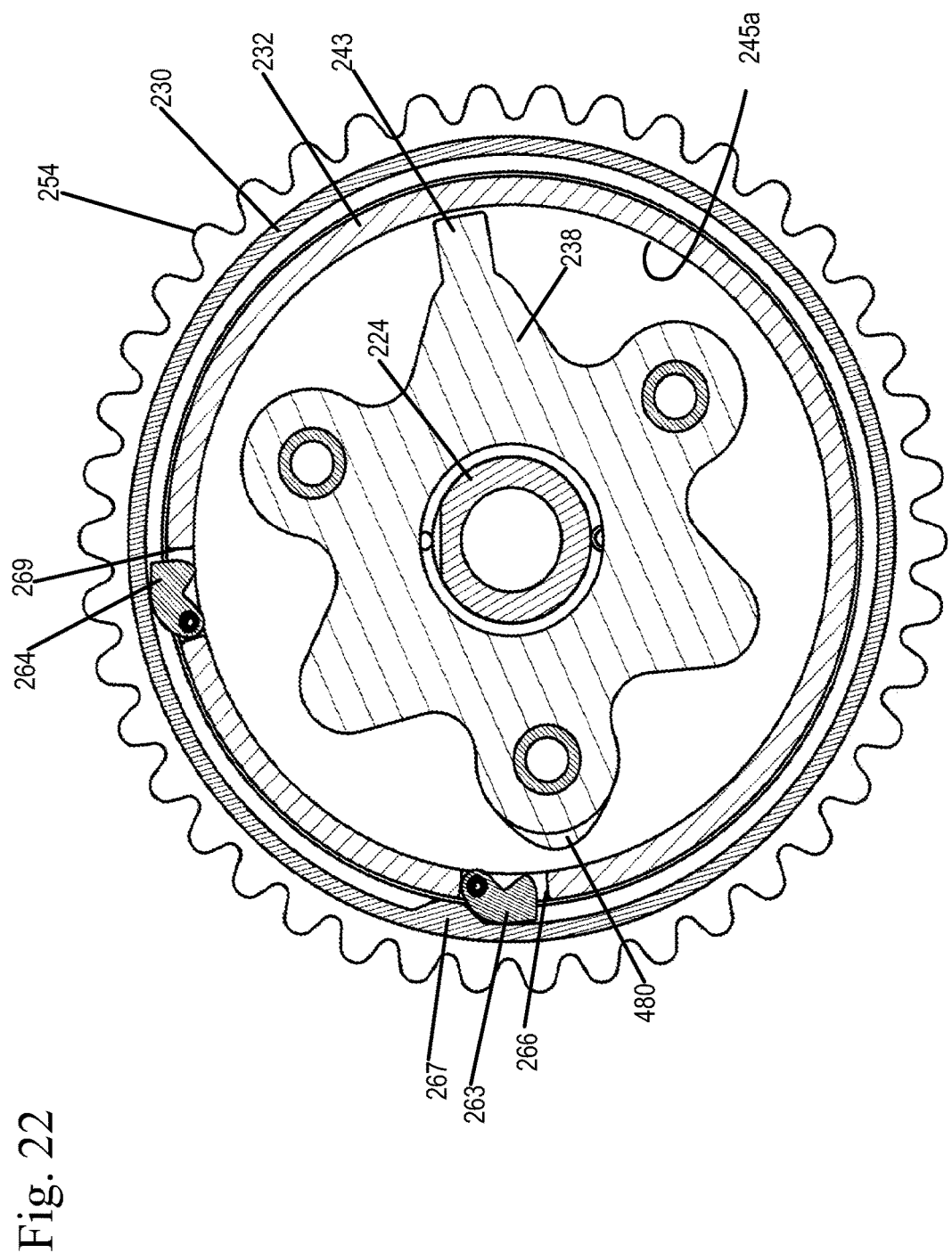
FIG. 22 shows a top section of the carrier approaching or departing an advance stop of the phaser of the third embodiment of the present invention.

FIG. 22 shows a schematic of the phaser 210 after rotation of the carrier 238 and the sun gear 224. The ring gears 230, 232 rotate in a counterclockwise direction, the sun gear 224 and the carrier 238 rotate clockwise, and the planetary gears 212, 214, 216 rotate in the counterclockwise direction. The cam mechanism 267 of the sprocket ring gear 230 is in a position such that the first or second spring biased pawls 263, 264 do not engage the cam mechanism 267. Therefore, the stop 243 of the carrier 238 does not engage with the either of the spring biased pawls 263, 264. As the ring gears 230, 232 rotate, the stop 243 of the carrier 238 rotates within an inner diameter 245a of the camshaft ring gear 232. The rotation of the carrier 238 and the ring gears 230,232 is such that the first and second pawls 263, 264 do not engage the stop of the carrier 238 until the phaser travel limit is reached.

Figure 23:
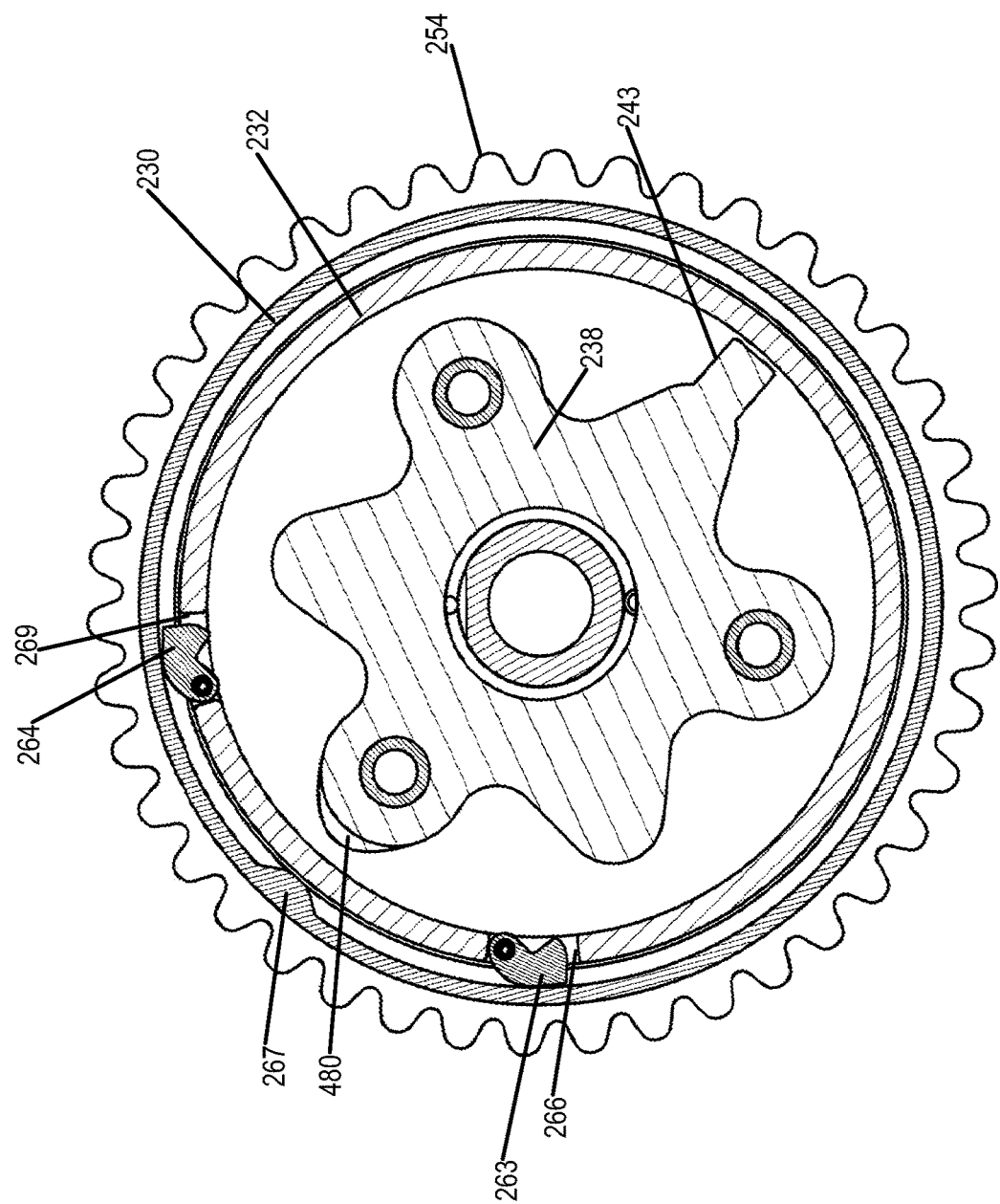
FIG. 23 shows a top section of the carrier at a mid-travel position of the phaser of the third embodiment of the present invention.

FIG. 23 shows the carrier in a mid-travel position. As shown in the figure, the first and second spring biased pawls 263, 264 do not engage the cam mechanism 267 on the sprocket ring gear 230 and the stop 243 on the carrier 238 continues to rotate within an inner diameter 245a of the camshaft ring gear 232.

Figure 24:
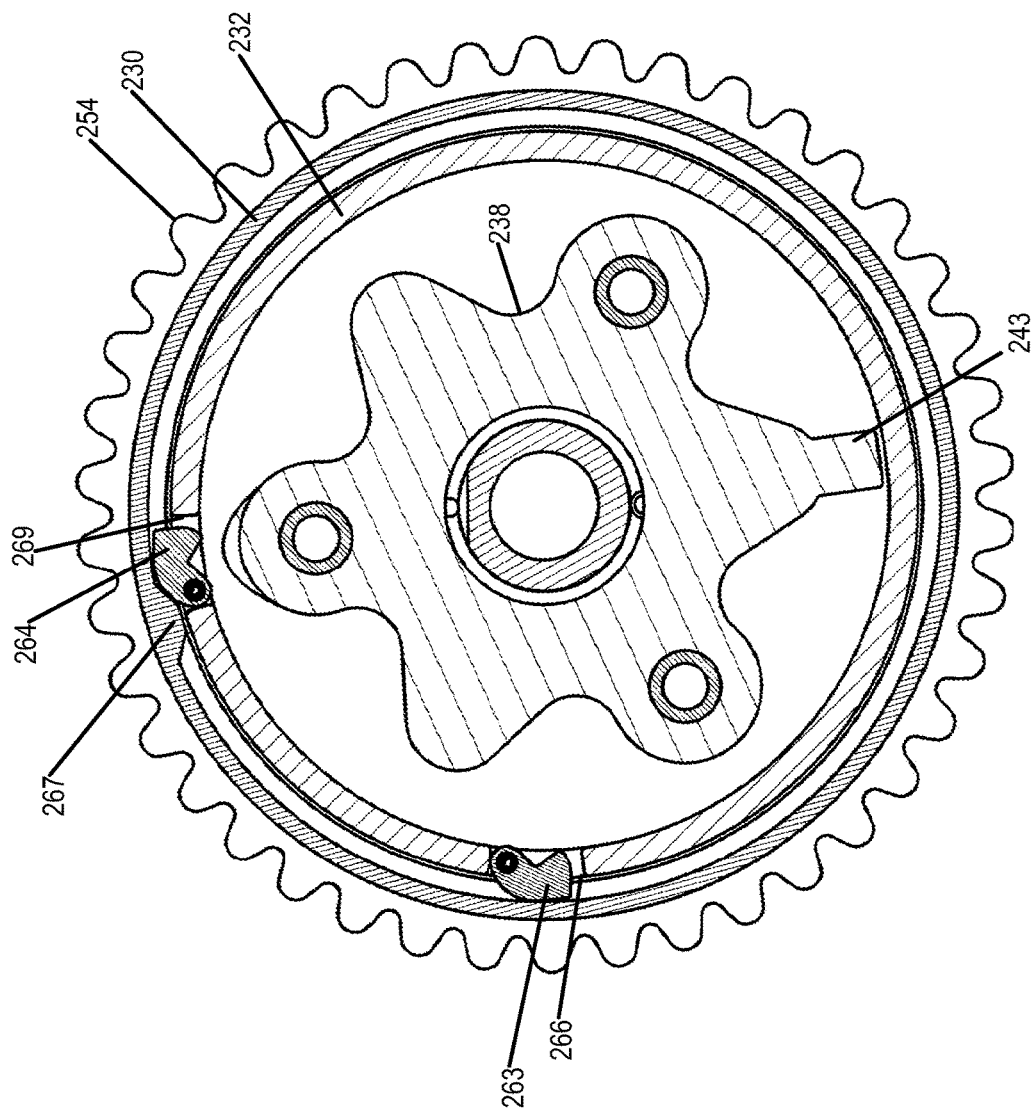
FIG. 24 shows a top section of the carrier approaching or departing a retard stop of the phaser of the third embodiment of the present invention.

FIG. 24 shows the phaser moving towards the retard stop with the carrier 238 and the sun gear 224 rotating in the clockwise direction and the camshaft ring gear 232 and the planet gears 212, 214, 216 rotating in the counterclockwise direction. The cam mechanism 267 of the sprocket ring gear 230 is in a position such that the first or second spring biased pawls 263, 264 do not engage the cam mechanism 267. Therefore, the stop 243 of the carrier 238 does not engage with the either of the spring biased pawls 263, 264. As the camshaft ring gear 232 rotates, the stop 243 of the carrier 238 rotates within an inner diameter 245a of the camshaft ring gear 232, and the stop 243 of the carrier 238 rotates past the first and second spring biased pawls 263, 264. The rotation of the carrier 238 and the ring gears 230, 232 is such that the first and second spring biased pawls 263, 264 do not engage the stop 243 of the carrier 238 until the phaser 210 travel limit is reached.

Figure 25:
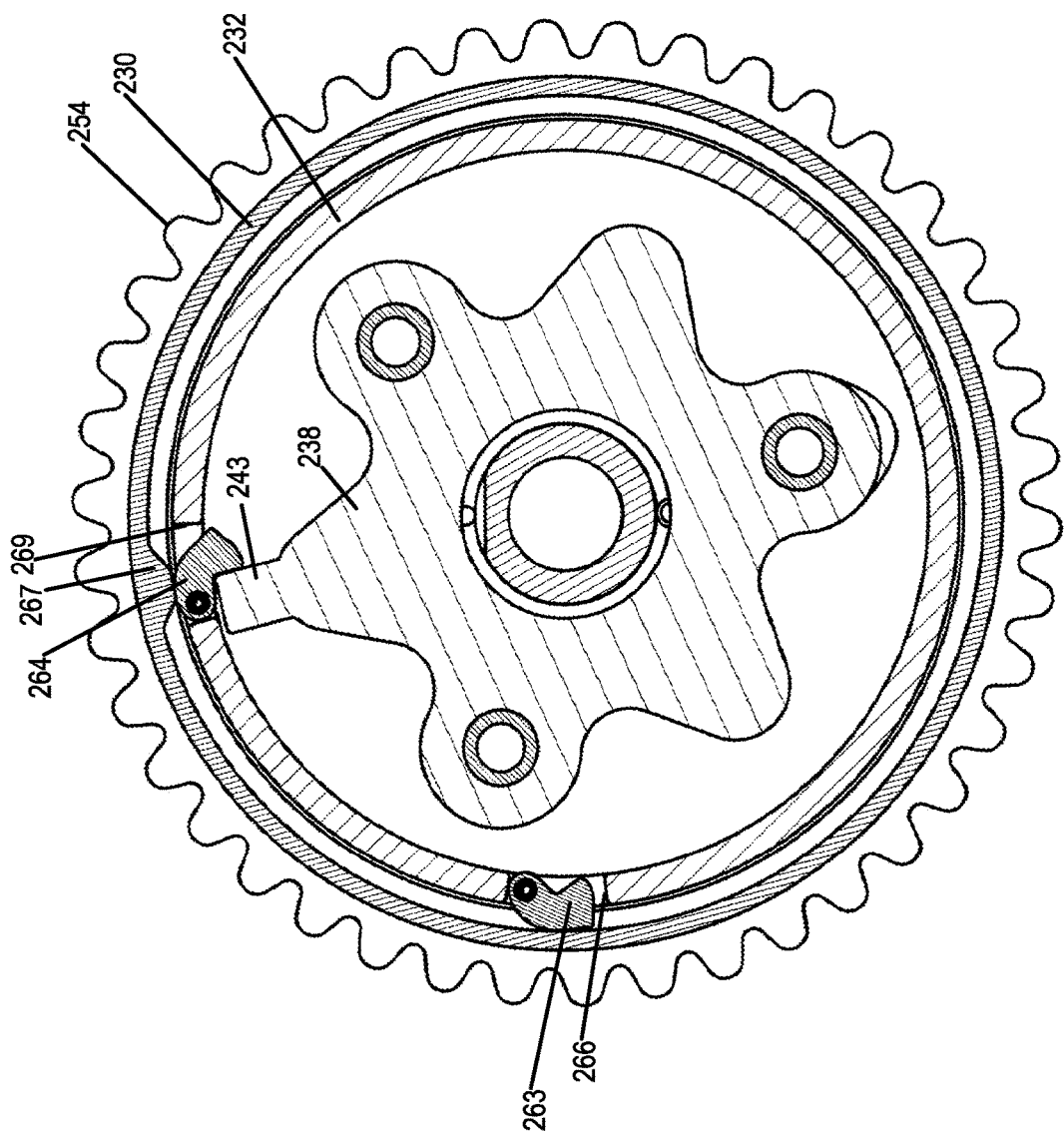
FIG. 25 shows a top section of the carrier engaged at the retard stop of the phaser of the third embodiment of the present invention.
Figure 26:
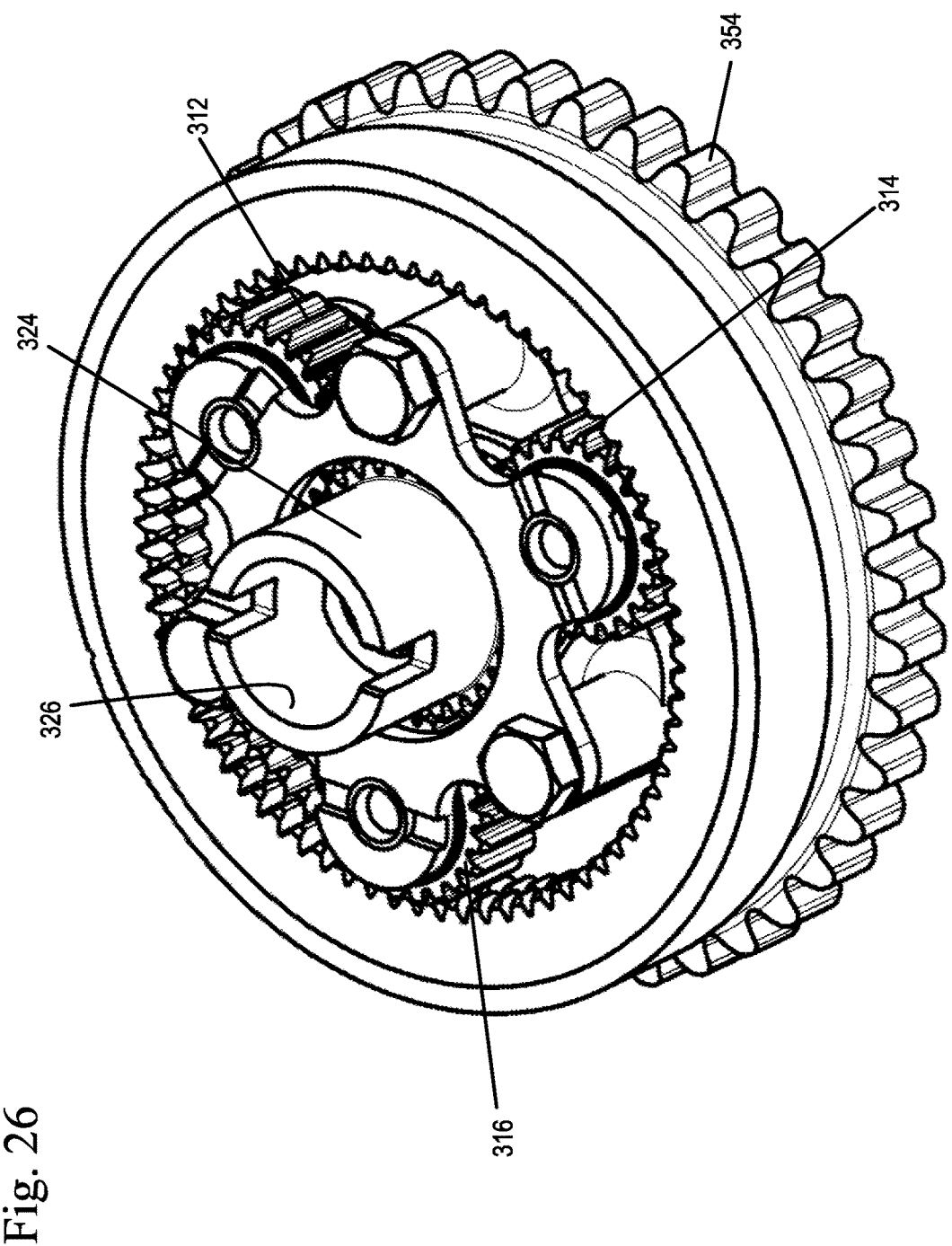
FIG. 26 shows a perspective view of a phaser of a fourth embodiment of the present invention with a travel end stop of a linear acting pin stop.
Figure 27:
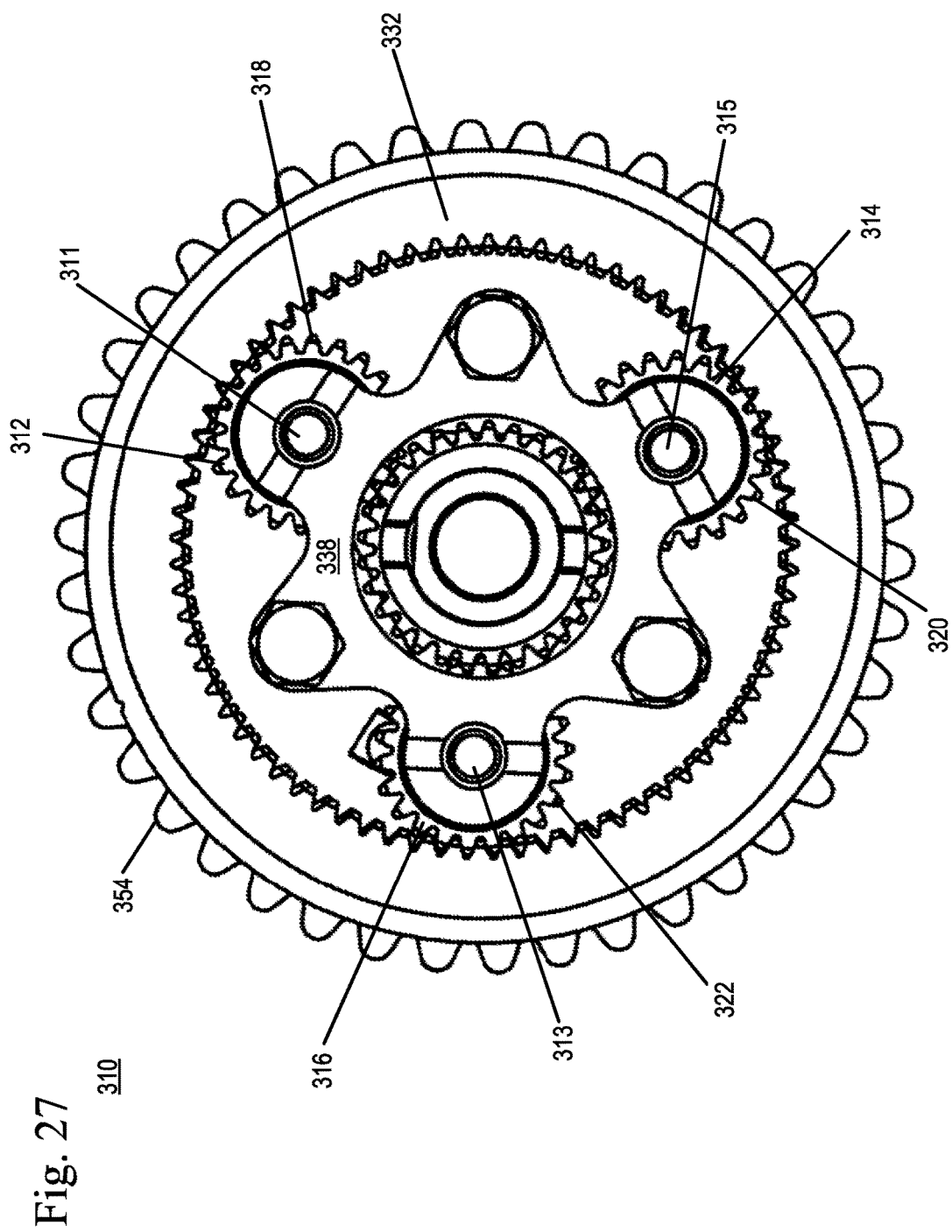
FIG. 27 shows a front view of the phaser of the fourth embodiment of the present invention.
Figure 28:
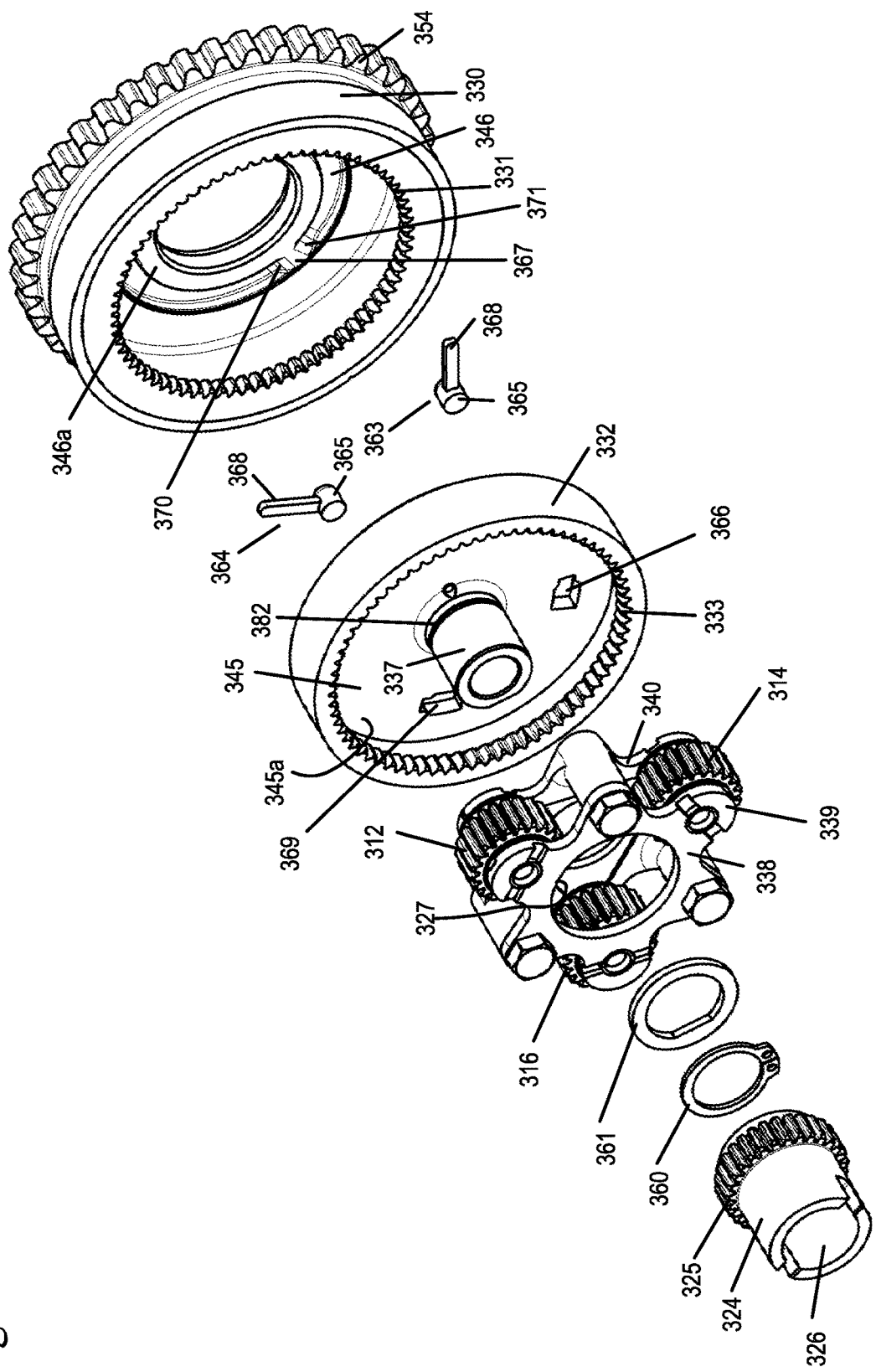
FIG. 28 shows an exploded view of the phaser of the fourth embodiment of the present invention.

FIG. 25 shows the carrier 238 engaged at the retard stop. The second spring biased pawl 264 engages a cam mechanism 267 on the sprocket ring gear 230. The engagement of the second spring biased pawl 264 with the cam mechanism 267 pushes the second spring biased pawl 264 inwards towards the carrier 238, so that as the carrier 238 rotates in a clockwise direction, the stop 243 of the carrier 238 engages the second spring biased pawl 264, preventing further rotation in the clockwise direction.

FIGS. 26-30 show a phaser of a fourth embodiment of the present invention with a travel end stop of a linear acting pin stop.

The phaser 310 has a split ring gear planetary drive which includes planet gears 312, 314, 316 with planet gear teeth 318, 320, 322, a centrally located sun gear 324 with sun gear teeth 325, and a split ring gear including a sprocket ring gear 330 and a camshaft ring gear 332.

The sun gear 324 has a bore 326 for receiving an output shaft (not shown).

The planet gears 312, 314, 316 are held together by a carrier 338. The carrier 338 has a first plate 339 and a second plate 340. Each planet gear 312, 314, 316 is connected to a first plate 339 and a second plate 340 which makes up the carrier 338 through pins 311, 313, 315 in which the planet gears 312, 314, 316 rotate. The carrier 338 has a centrally located bore 327 for receiving the sun gear 324. The carrier 338 also has a stop 343. The sun gear teeth 325 are aligned with and engage the planet gear teeth 318, 320, 322. The carrier 338 is kept in place axially by a retaining ring 360 and washer 361 received within a slot 382 in a centrally located flange 337 of the camshaft ring gear 332.

The carrier 338 and associated planet gears 312, 314, 316 are received within an inner diameter 345a defining a bore 345 of the camshaft ring gear 332.

The camshaft ring gear 332 has a first ramped slot 366 for receiving a first pin 363 and a second ramped slot 369 for receiving the second pin 364. The first pin 363 and second pin 364 each have a pin head 365 and a length portion 368 extending from the pin head 365. Present within the inner diameter 345a of the camshaft ring gear 332 is a set of ring gear teeth 333.

The camshaft ring gear 332 is received by a bore 346 formed by an inner diameter 346a of the sprocket ring gear 330. The outer circumference of the spring ring gear 330 contains sprocket teeth 354. A portion of an inner diameter 346a of the sprocket ring gear 330 contains ring gear teeth 331. Also present within the inner diameter 346a of the sprocket ring gear is a cam mechanism 367. The cam mechanism 367 is formed by ramps 370, 371. The cam mechanism 367 is spaced at an interval along an inner diameter of the sprocket ring gear 330. The cam mechanism 367 raises the head of the pin 365 to a first position, such that a portion of the length portion 368 of the pin 363, 364 contacts the ramped portion 373 of the ramped slot 366, 369 limiting travel of the pin head 365 into the bore 345 of the camshaft ring gear 332. When the pins 363, 364 do not contact the cam mechanism 367, the pin head 365 rests in a slot 366 in the sprocket ring gear 330 and only an end of the length portion 368 of the pin 363, 364 is contained by the ramped portion 373 of the slot 366, 369. When the pin 363, 364 is in the first position, the pin head 365 interferes with the rotation of the carrier 338.

The ring gears 330, 332 have different numbers of teeth 331, 333, where the difference in the number of teeth is a multiple of the number of planet gears 312, 314, 316. The ring gear teeth 331, 333 have profiles to allow the ring gears 330, 332 to mesh properly with the planet gears 312, 314, 316.

The planetary gears 312, 314, 316 rotate around the sun gear 324 and within the ring gears 330, 332 such that the planetary gears 312, 314, 316 travel along hypocycloid curves, a curve generated by the trace of a fixed point on a small circle (planetary gear) that rolls within a larger circle (ring gear).

Figure 30:
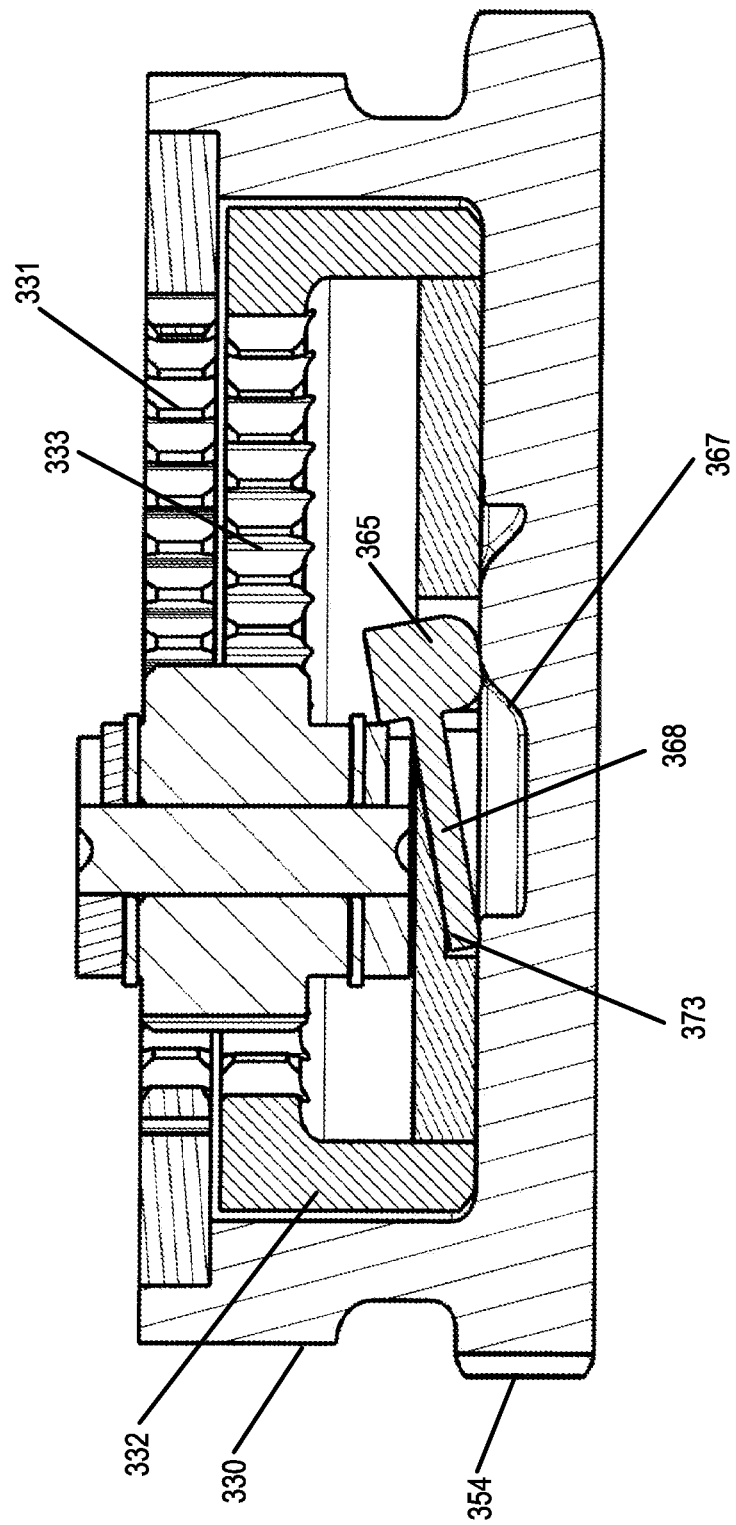
FIG. 30 shows a top section of the carrier engaged at the advance stop of the phaser of the fourth embodiment of the present invention.
Figure 31:
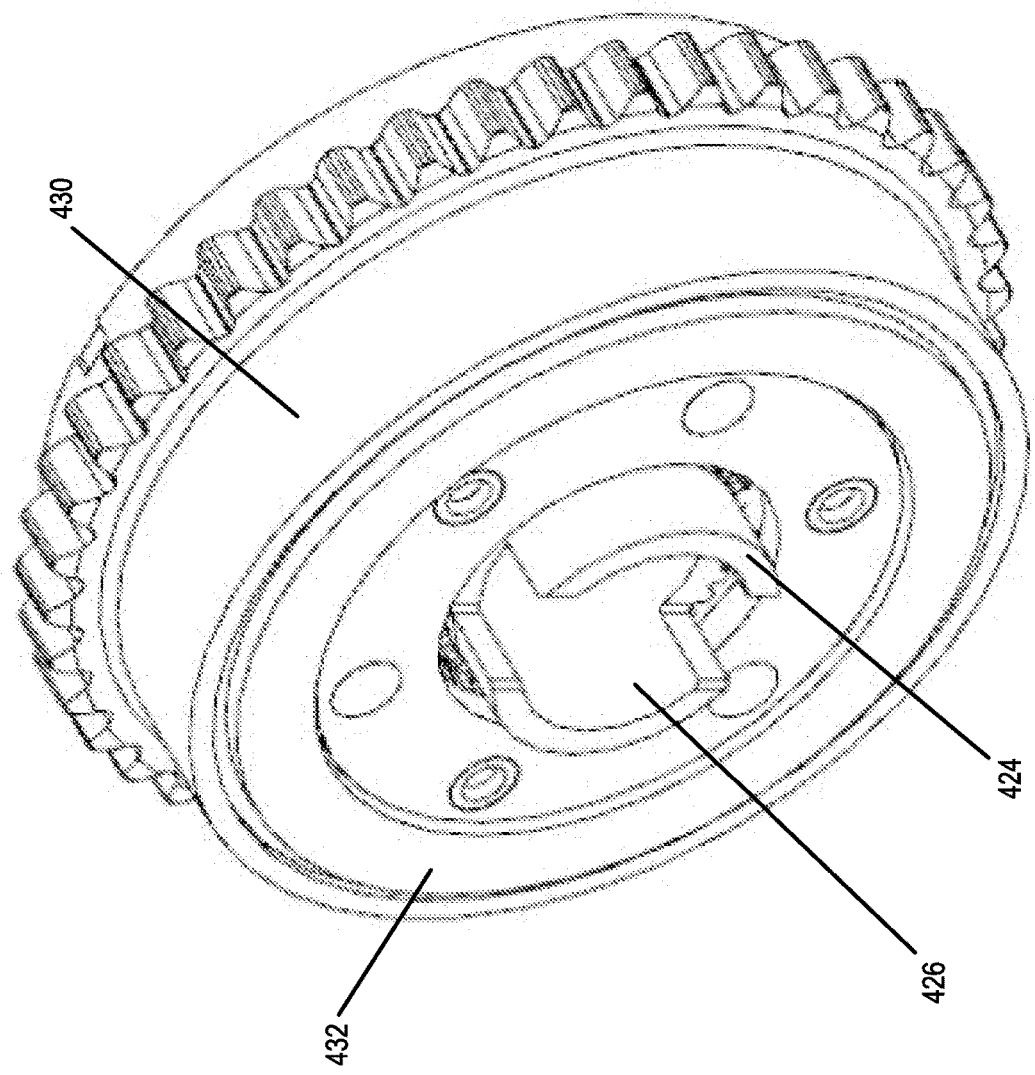
FIG. 31 shows a perspective view of a phaser of a fifth embodiment of the present invention.
Figure 32:
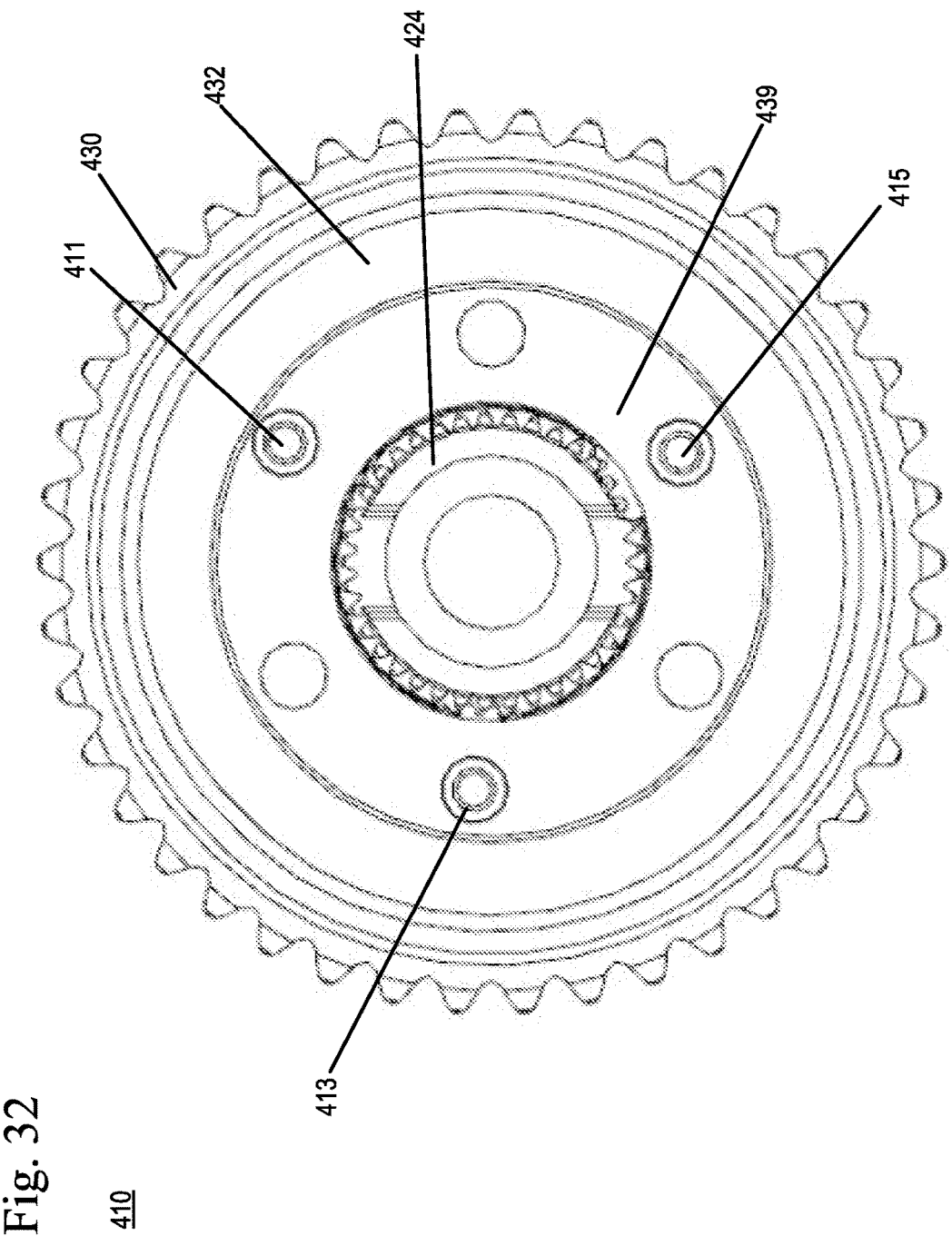
FIG. 32 shows a front view of a phaser of a fifth embodiment of the present invention.

When the phaser 310 is in an advanced stop position as shown in FIG. 30, the cam mechanism 367 of the sprocket ring gear 330 is positioned such that the cam mechanism 367 raises the head of the pin 365 to a first position. In the first position of the first pin 363, a portion of the length portion 368 of the pin 363 contacts the ramped portion 373 of the slot 366, limiting travel of the pin head 365 into the bore 345 of the camshaft ring gear 332 and allowing the pin head 365 to interfere with the rotation of the carrier 338, and thus the carrier 338 can no longer rotate any further in current direction of travel or in the same direction, and can only turn in the opposite direction. Thus, the phaser is held in a position representing a maximum advanced condition.

An engine crankshaft (not shown) is rotationally engaged through a timing chain (not shown) to the sprocket ring gear 330 through a sprocket 354, and the engine camshaft is rotationally engaged to the camshaft ring gear 332. A motor (not shown) is rotationally engaged with the sun gear 324 by way of an output shaft (not shown). When the sun gear 324 is rotated by the motor at the same speed as either of the ring gears 330, 332, since both ring gears 330, 332 rotate in unison, a constant cam phase position is maintained. When the sun gear 324 is driven at a different speed from the ring gears 330, 332 by the electric motor, a slightly different speed of one ring gear to the other ring gear causes a cam phase shift function. In this way, a very high numerical ratio is obtained and the camshaft is phased either plus or minus from the nominal rotational relationship of the crankshaft to the camshaft.

The phaser is preferably used to dynamically adjust the rotational relationship of the camshaft to the engine crankshaft either to improve the fuel efficiency of the engine or to provide greater power under load or acceleration.

FIG. 30 shows the phaser 310 with first pin 363 engaging the ramped portion 373 of the slot 366, with the pinhead 365 interfering with the carrier 338, limiting the travel of the phaser in a first direction to a first stop position (advanced). In this position, the first pin 363 is pushed inwards towards the carrier 338 by a cam mechanism 367 of the sprocket ring gear 333. The movement of the first pin 363 inwards ensures that the first pin 363 engages with carrier 338 and halts any further rotation of the sprocket ring gear 332 clockwise, and halts any further rotation of the planetary gears 312, 314, 316 and carrier 338 and the sun gear 324 in the direction corresponding to sprocket rotation.

Figure 29:
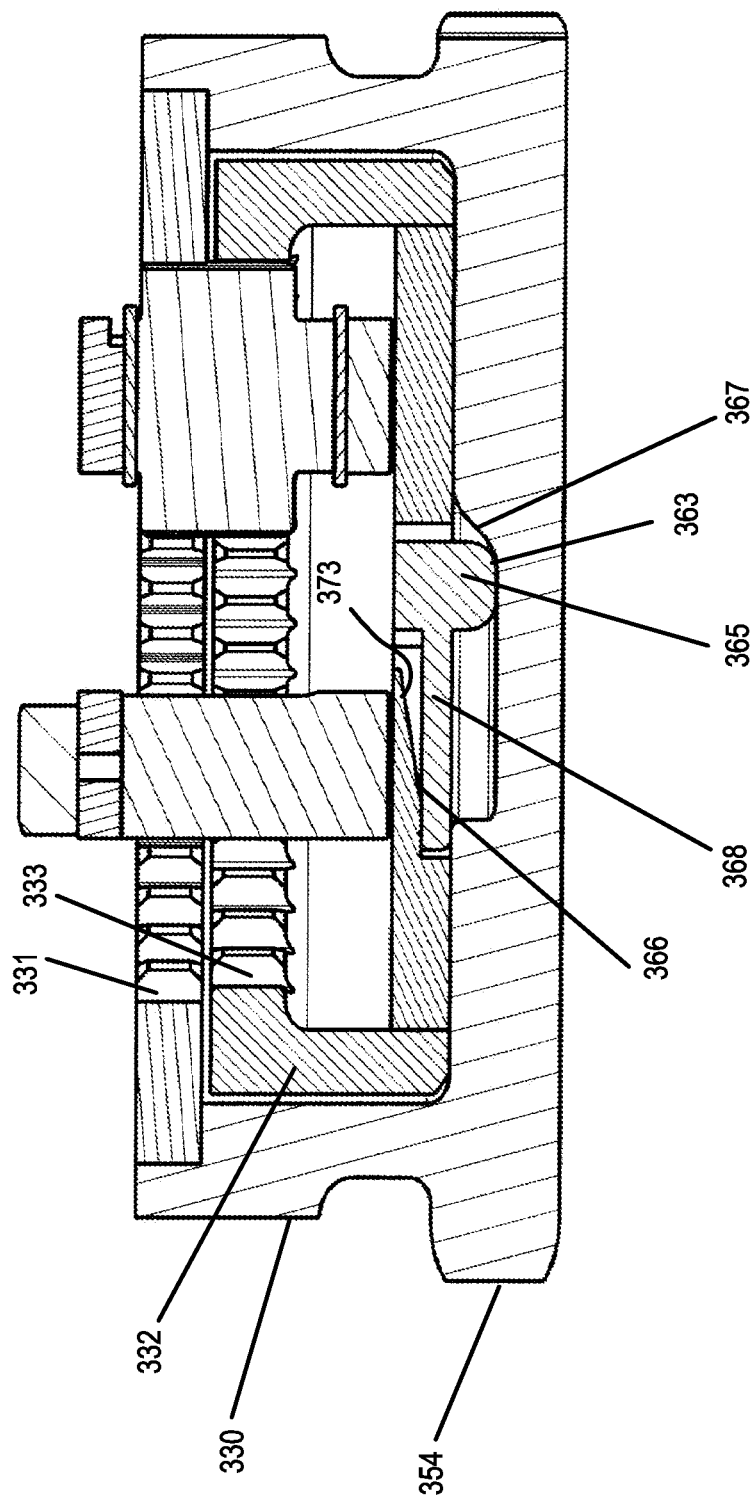
FIG. 29 shows a top section of the carrier approaching or departing an advance stop of the phaser of the fourth embodiment of the present invention.

FIG. 29 shows a schematic of the phaser 310 after rotation of the carrier 338 and the sun gear 324. The camshaft ring gear 332 rotates in a counterclockwise direction, the sun gear 324 and the carrier 338 rotate clockwise, and the planetary gears 312, 314, 316 rotate in the counterclockwise direction. The cam mechanism 367 of the sprocket ring gear 230 is in a position such that the pin heads 365 of the first or second pins 363, 364 do not engage the cam mechanism 367. Therefore, the sun gear 324 and carrier 338 do not engage with the either of the pin heads 365 of the first and second pins 363, 364. The rotation of the sun gear 324 and carrier 338 continues until the cam mechanism 267 forces the pin to move from a second position to a first position, engaging the carrier 338, preventing movement further in that direction.

While the retard stop is not shown, the second pin 364 would engage with the carrier 338, preventing travel in that direction.

FIGS. 31-37 show a phaser of a fifth embodiment of the present invention with a deadbolt and key received in a slot.

The phaser 410 has a split ring gear planetary drive which includes planet gears 412, 414, 416 with planet gear teeth 418, 420, 422, a centrally located sun gear 424 with sun gear teeth 425, and a split ring gear including a sprocket ring gear 430 and a camshaft ring gear 432.

The sun gear 424 has a bore 426 for receiving an output shaft (not shown).

The planet gears 412, 414, 416 are held together by a carrier 438. The carrier 438 has a first plate 439 and a second plate 440. Each planet gear 412, 414, 416 is connected to a first plate 439 and a second plate 440 which makes up the carrier 438 through pins 411, 413, 415 in which the planet gears 412, 414, 416 rotate. On at least one of the plates of the carrier is a stop 443. The stop 443 may be a bent portion of the carrier 438. The carrier 438 has a centrally located bore 427 for receiving the sun gear 424. The sun gear teeth 425 of the sun gear 424 are aligned with and engage the planet gear teeth 418, 420, 422.

Figure 33:
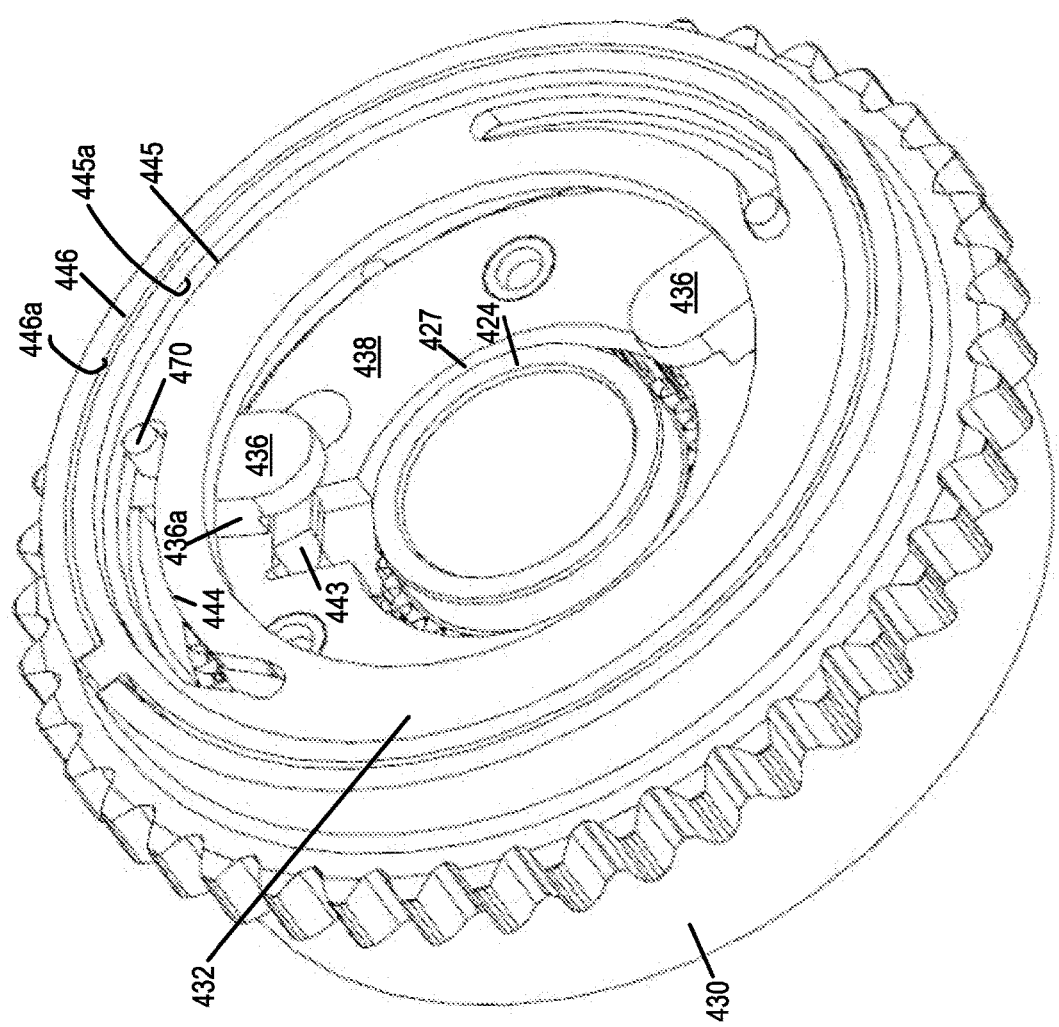
FIG. 33 shows a close up perspective view of the phaser of a fifth embodiment of the present invention with the deadbolt passing the stop and inner plate hidden from view.
Figure 34:
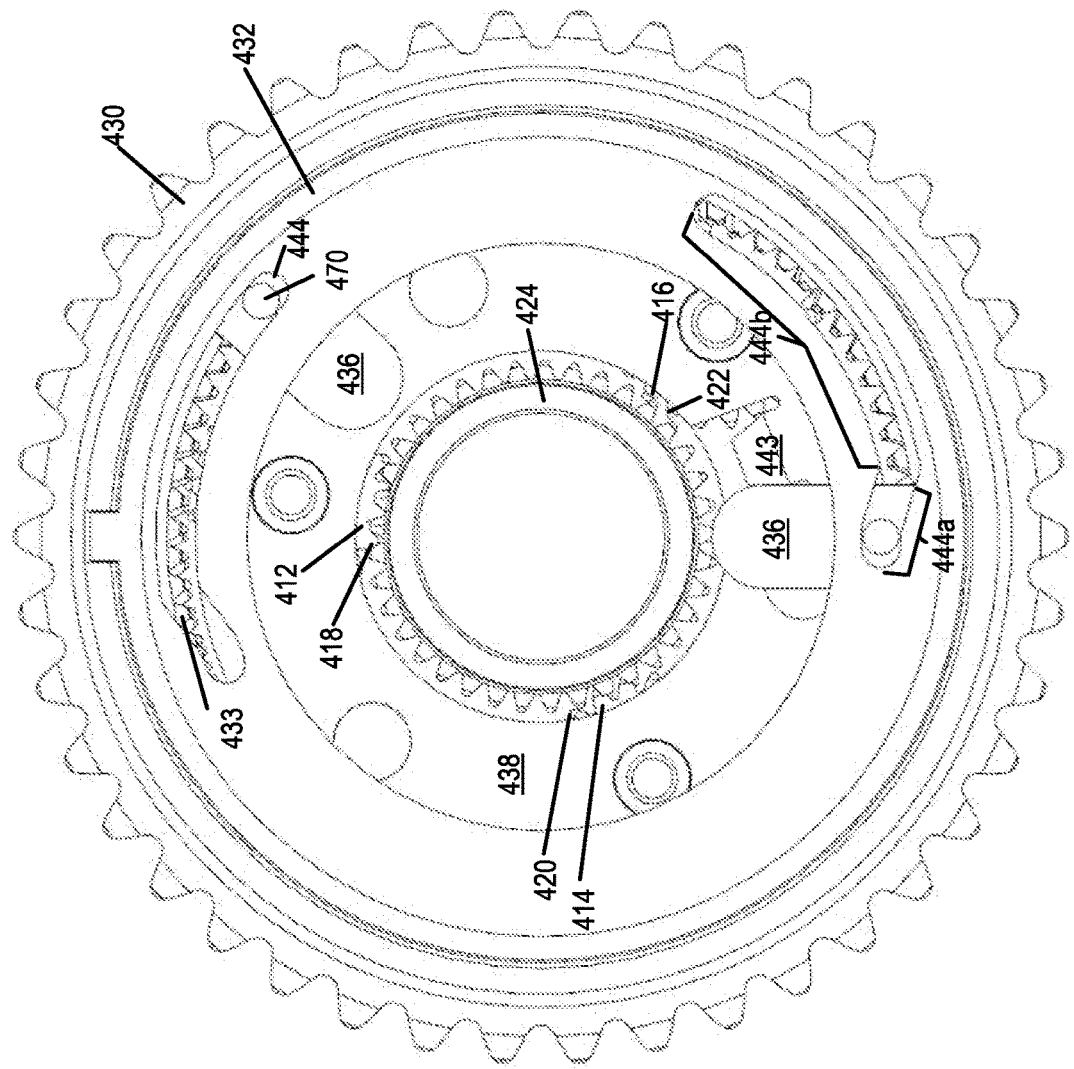
FIG. 34 shows a rear view of the phaser of the fifth embodiment of the present invention with the deadbolt engaging the stop and inner plate hidden from view.
Figure 35:
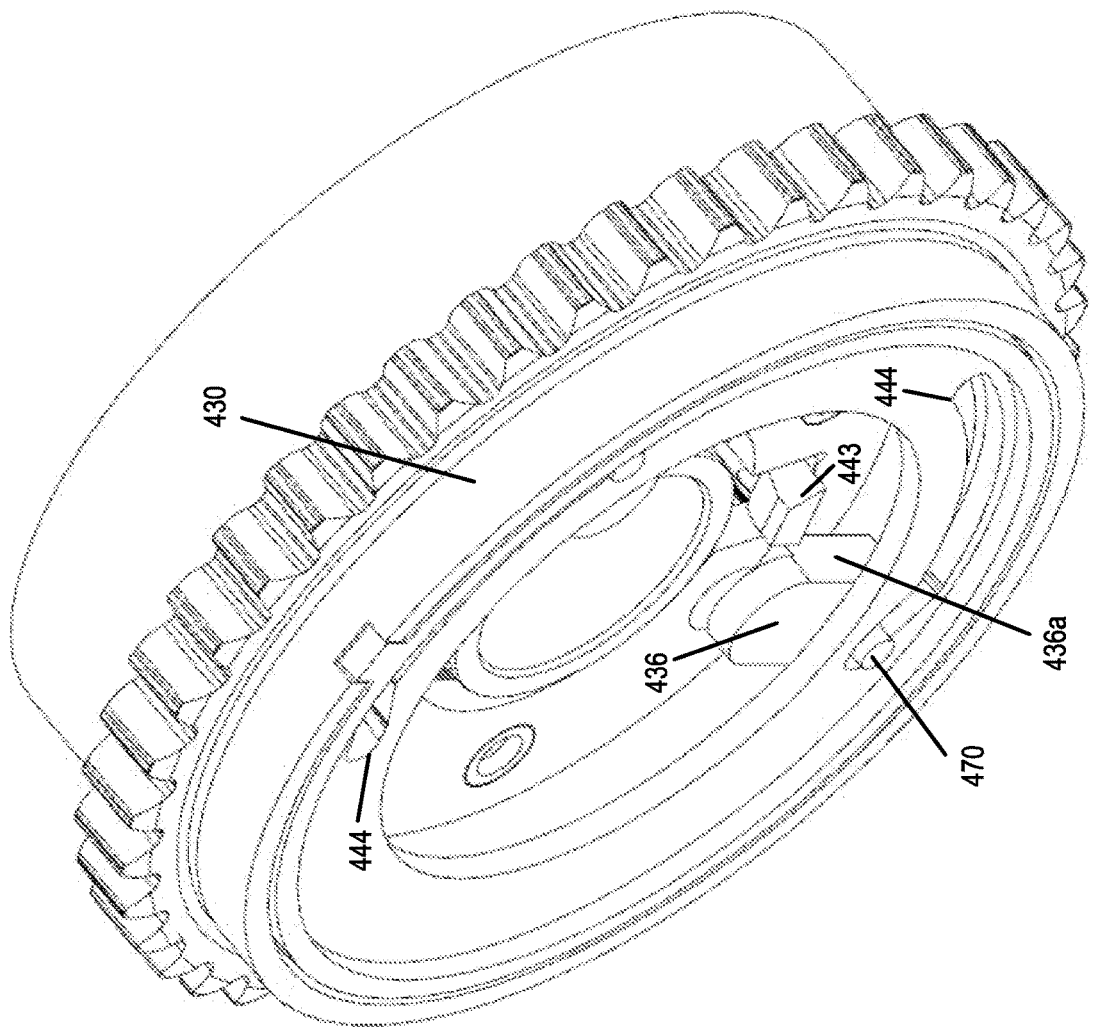
FIG. 35 shows a tilted perspective view of the phaser of the fifth embodiment of the present invention with the deadbolt contacting the stop and inner plate hidden from view.
Figure 36:
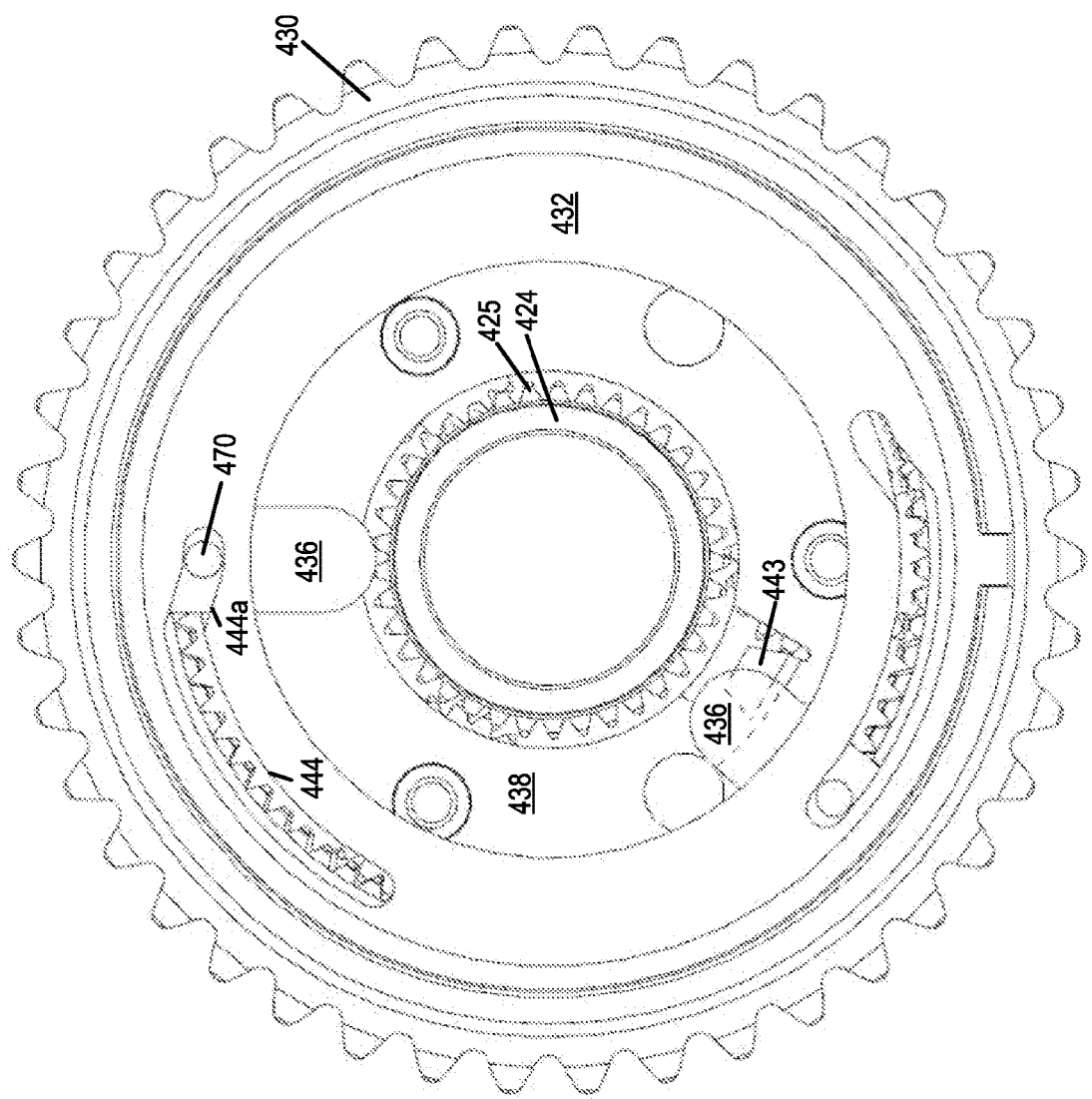
FIG. 36 shows a rear view of the phaser of the fifth embodiment of the present invention, with the deadbolt contacting the stop and inner plate hidden from view.
Figure 37:
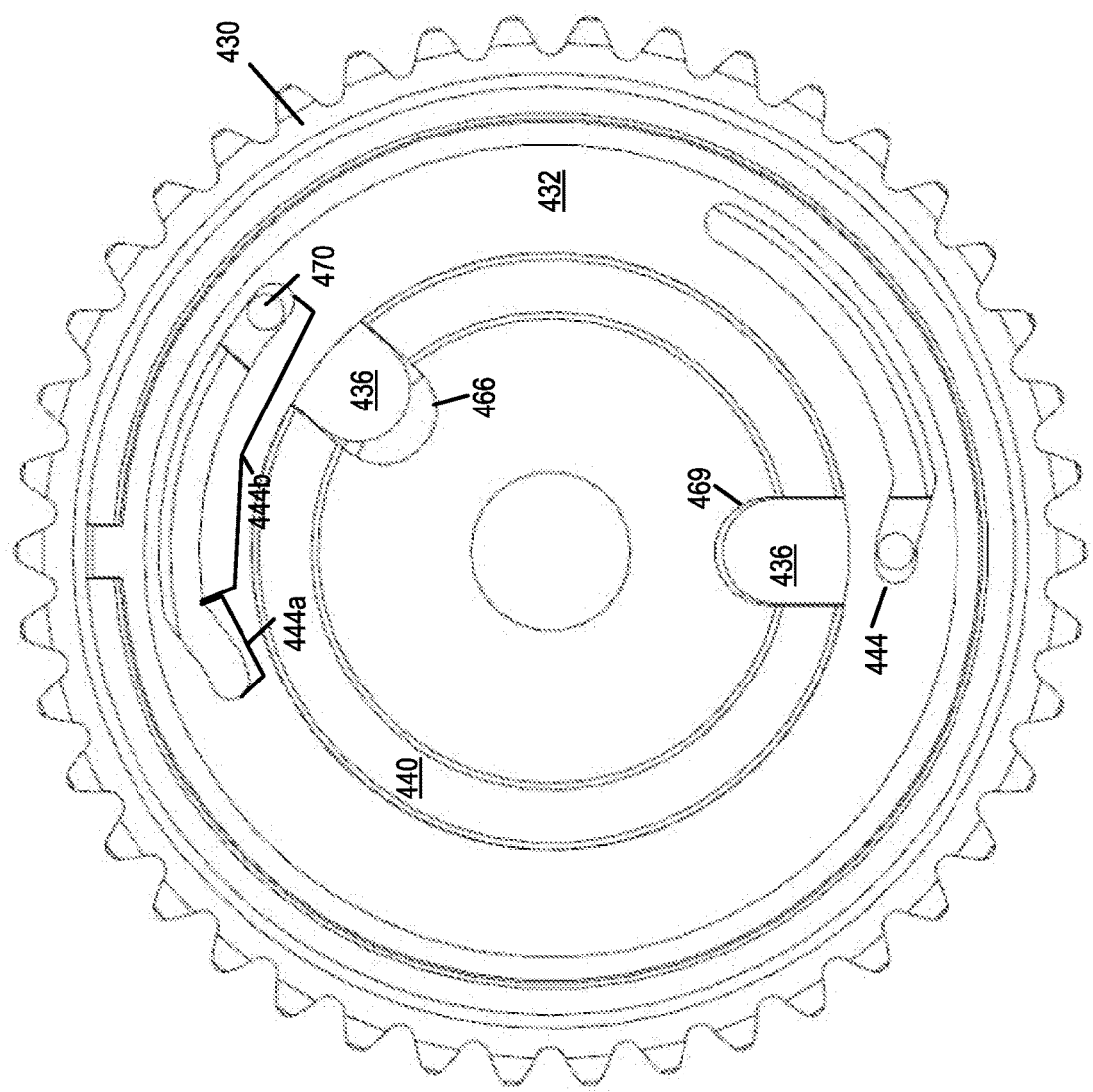
FIG. 37 shows a back view of the phaser of the fifth embodiment of the present invention with the travel of the deadbolt being limited.

The carrier 438 and associated planet gears 412, 414, 416 are received within an inner diameter 445a defining a bore 445 of the camshaft ring gear 432. The camshaft ring gear 432 has a centrally located flange (not shown) that is received by the bore 427 of the carrier 438. Within the inner diameter 445a of the camshaft ring gear 432 is a set of ring gear teeth 433. A slot 444 is present on an outer face of the sprocket ring gear 430 and receives a key 470 of a stop or deadbolt 436. The key 470 may be a protrusion. The slot 444 has a locking portion 444a and an unlocking portion 444b along its length. The locking portion 444a is preferably angled at at least one end of the slot 444. The slot 444 may be milled. The deadbolt 436 extends a length and has a tab portion 436a that may abut the stop 443 of the carrier 438 in specific positions, for example when the key 470 of the deadbolt 436 is engaged in the locking portion 444a of the slot 444 as shown in FIGS. 35-36. When the key 470 is present within the unlocking portion 444b, the tab 436a of the deadbolt 436 is positioned such that it bypasses engaging the stop 443 of the carrier 438 as shown in FIGS. 33-34. It should be noted that while two deadbolts are shown to interface with the stop 443 of the carrier 438, one for each direction of travel, one deadbolt may be used with a slot 444 having a first locking portion 444a and a second locking portion (not shown).

The camshaft ring gear 432 is received by a bore 446 formed by an inner diameter 446a of the sprocket ring gear 430.

On the inner diameter 446a of the sprocket ring gear 430 are sprocket ring gear teeth 431. The ring gears 430, 432 have different numbers of teeth 431, 433, where the difference in the number of teeth is a multiple of the number of planet gears 412, 414, 416. The ring gear teeth 431, 433 have profiles to allow the ring gears 430, 432 to mesh properly with the planet gears 412, 414, 416.

The planetary gears 412, 414, 416 rotate around the sun gear 424 and within the ring gears 430, 432 such that the planetary gears 412, 414, 416 travel along hypocycloid curves, a curve generated by the trace of a fixed point on a small circle (planetary gear) that rolls within a larger circle (ring gear).

While not discussed, in the above embodiments, the carrier 38, 138, 238 may contain an additional feature 480 that restores the snap ring 162, pivoting pawls 263, 264, or deadbolt 36 back to a position which does not interfere with the stop 43, 143, 243 on the carrier 38, 138, 238 if the spring 35, 267 or resilience of the snap ring 162 fails. The additional feature 480 resets the snap ring 162, pivoting pawls 263, 264 or deadbolt 36. The feature may be an extension of the carrier 38, 138, 238. The extension is of a length that is long enough to reset the snap ring 162, pivoting pawls 263, 264 or deadbolt 34 back into the slot 34 or pocket 44 in the camshaft ring gear 32, 132, 232, but not interfere with the snap ring 162, pivoting pawls 263, 264 or deadbolt 36 otherwise. It should be noted that in the embodiment with the pins 363, 364, the additional feature may be present on an axial face. The additional feature 480 may also restore the deadbolt 436 back to a position which does not interfere with the stop 443 on the carrier 38.

Additionally, although the camshaft ring gear 32, 132, 232, 332, 432 is shown with pockets 44, 166, 169, 266, 269, 366, 369, 466, 469, and the sprocket ring gear 30, 130, 230, 330, 430 has a slot 34, 444 with ends 34a, 34b, 444a or a cam mechanism 167, 267, 367, the sprocket ring gear could contain at least one pocket and the camshaft ring gear contain at least one slot with ends or at least one cam mechanism.

Furthermore, while the above embodiments show a carrier 38, 138, 238, 338, 438 with a stop 43, 143, 243, 443, the stop could be placed on the sun gear 24, 124, 224, 324, 424 or a planet 12, 14, 16, etc. with a corresponding change in the slot ends 34a, 34b, 444a or cam mechanism 167, 267, 367 to account for the rotation of the sun gear or the planetary gears.

In the descriptions above, the phaser 10, 110, 210, 310, 410 is stopped at an end of travel when the stop 36, 136, 236, 336, 436 engages with the carrier stop 43, 143, 243, 443. The slot ends 34a, 34b, 444a or cam mechanism 167, 267, 367 could also have a limiting feature that engages with the stop 36, 136, 236, 336, 436 as either reinforcement of the stopping action of the stops 36, 136, 236, 336, 436 or as a failsafe. Stopping one of the rings gears relative to the other directly may also be used as a failsafe mechanism.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A split ring planetary drive for adjusting relative phases of a first shaft and a second shaft, comprising:
   a sun gear rotatable around a sun axis, the sun gear comprising a plurality of sun gear teeth;
   a plurality of planetary gears arranged around the sun gear, each planetary gear comprising a plurality of planetary teeth maintaining the planetary gear in meshing engagement with the sun gear teeth;
   a planet carrier having a stop, the planet carrier being rotatable with the plurality of planetary gears;
   a first ring gear rotatable with the first shaft, the first ring gear comprising a plurality of first ring gear teeth maintaining the first ring gear in meshing engagement with the planetary gear teeth of each of the planetary gears;
   a second ring gear rotatable with the second shaft, the second ring gear comprising a plurality of second ring gear teeth maintaining the second ring gear in meshing engagement with the planetary gear teeth of each of the planetary gears; and
   at least one travel end stop received in at least one pocket of the first ring gear, the at least one travel end stop being moveable between a first stop position in which as the planetary drive rotates in a direction the travel end stop engages the stop on the planet carrier, preventing further rotation of the split ring planetary drive in the direction, and a second position in which the travel end stop does not engage the stop on the planet carrier.

2. The split ring planetary drive of claim 1, wherein the second ring gear further comprises a slot having at least one angled end and a length, and the travel end stop is a deadbolt having a first end extendable into the slot in the second ring gear and a second end forming the travel end stop, the deadbolt being biased toward the second stop position.

3. The split ring planetary drive of claim 2, wherein when the first end of the deadbolt is received within the length of the slot of the second ring gear, the deadbolt is in the second position and does not inhibit travel of the planet carrier and when the deadbolt engages the first angled end or the second angled end of the slot, the deadbolt moves toward the first stop position to engage the stop on the carrier.

4. The split ring planetary device of claim 2, wherein the first end of the deadbolt is a protrusion.

5. The split ring planetary drive of claim 1, wherein the travel end stop is a pivoting pawl biased toward the second position, and the second ring gear further comprises a cam mechanism within the bore of the second ring gear, such that contact between the cam mechanism and the pivoting pawl moves the pivoting pawl into the first stop position.

6. The split ring planetary drive of claim 1, wherein the travel end stop is a snap ring with a ring portion received by an inner diameter of the first ring gear, and a first end and a second end received in pockets of the first ring gear, and the second ring gear comprises a cam mechanism along an inner diameter of the second ring gear such that contact between the cam mechanism and either the first end or the second end of the snap ring moves the first end or the second end of the snap ring into the first stop position.

7. The split ring planetary drive of claim 1, wherein the first shaft is a camshaft and the second shaft is a crankshaft.

8. The split ring planetary drive of claim 2, wherein the stop is biased towards the second position with a resilient spring element.

9. A split ring planetary drive for adjusting relative phases of a first shaft and a second shaft, comprising:
   a sun gear rotatable around a sun axis, the sun gear comprising a plurality of sun gear teeth;
   a plurality of planetary gears arranged around the sun gear, each planetary gear comprising a plurality of planetary teeth around an axial portion, the planetary teeth being in meshing engagement with the sun gear teeth;
   a planet carrier rotatable with and connected to the plurality of planetary gears;
   a first ring gear rotatable with the first shaft, the first ring gear comprising a plurality of first ring gear teeth in meshing engagement with the planetary gear teeth of each of the planetary gears;
   a second ring gear rotatable with the second shaft, the second ring gear comprising a plurality of second ring gear teeth in meshing engagement with the planetary gear teeth of each of the planetary gears; and
   at least one travel end stop received in a pocket of the first ring gear, the pocket having a ramped slot, the travel end stop being moveable between a first stop position in which the first travel end stop engages with the ramped slot and an axial portion of the planet carrier, preventing rotation of the split ring planetary drive in a direction, and a second position in which the travel end stop does not engage the ramped slot or the axial portion of the planetary gear.

10. The split ring planetary drive of claim 9, wherein the travel end stop comprises a pin having a head portion and a length portion connected to the head portion, wherein the length portion of the pins engages the ramped slot.

11. The split ring planetary drive of claim 9, wherein the first shaft is a camshaft and the second shaft is a crankshaft.

12. A device for adjusting relative phases of a first shaft and a second shaft, the device comprising:
  a member which rotates more than a revolution to effect a change in the phase between the first shaft and the second shaft, the member comprising an engagement surface; and
  a stop piece moveable from a first position to a second position dependent on a phase of the first shaft relative to the second shaft;
  wherein the stop piece is received in a pocket of the first or second shaft;
  wherein a range of rotation of the first shaft and the second shaft is less than one revolution; and
  wherein the engagement surface engages the stop piece to limit a range of motion of the first shaft relative to the second shaft.

13. The device of claim 12, wherein the member is selected from a group consisting of: a planetary gear, a sun gear, and a carrier of planetary gears.

14. The device of claim 12, wherein the stop piece received in a pocket of the first or second shaft is moveable from the second position to the first position by an angled portion of the other of the first or second shaft.

15. The device of claim 14, wherein the member includes a feature to move the stop piece from the first position to the second position.

* * * * *